(12) United States Patent
He et al.

(10) Patent No.: US 7,814,564 B2
(45) Date of Patent: Oct. 12, 2010

(54) METHOD FOR FINGERPRINTING MULTIMEDIA CONTENT

(75) Inventors: Shan He, College Park, MD (US); Min Wu, Clarksville, MD (US)

(73) Assignee: University of Maryland, College Park, MD (US)

( * ) Notice: Subject to any disclaimer, the term of this patent is extended or adjusted under 35 U.S.C. 154(b) by 1092 days.

(21) Appl. No.: 11/326,313

(22) Filed: Jan. 6, 2006

(65) Prior Publication Data

US 2007/0180537 A1 Aug. 2, 2007

Related U.S. Application Data

(60) Provisional application No. 60/642,286, filed on Jan. 7, 2005.

(51) Int. Cl.
G06F 7/04 (2006.01)
(52) U.S. Cl. .................. 726/32; 382/116; 713/186
(58) Field of Classification Search ............ 726/26, 726/32; 382/116; 713/186
See application file for complete search history.

(56) References Cited

U.S. PATENT DOCUMENTS

| | | | | | |
|---|---|---|---|---|---|
| 6,076,165 | A * | 6/2000 | Maenza | ................. | 726/29 |
| 6,104,826 | A * | 8/2000 | Nakagawa et al. | .......... | 382/100 |
| 6,246,349 | B1 * | 6/2001 | Malik et al. | ................. | 341/106 |
| 6,691,229 | B1 * | 2/2004 | Nelson | ................. | 713/193 |
| 6,754,364 | B1 * | 6/2004 | Yacobi | ................. | 382/100 |
| 7,036,024 | B2 * | 4/2006 | Watson | ................. | 726/22 |
| 7,068,823 | B2 * | 6/2006 | Malik et al. | ................. | 382/124 |
| 7,177,442 | B2 * | 2/2007 | Yacobi | ................. | 382/100 |
| 2004/0010692 | A1 * | 1/2004 | Watson | ................. | 713/176 |
| 2007/0180537 | A1 * | 8/2007 | He et al. | ................. | 726/32 |

OTHER PUBLICATIONS

Boneh, D., et al., "Collusion-Secure Fingerprinting for Digital Data", IEEE Transactions on Information Theory, vol. 44, No. 5, Sep. 1998, pp. 1897-1905.
Safavi-Naini, R., et al., 18 page preprint of "Collusion Secure q-ary Fingerprinting for Perceptual Content", Security and Privacy in Digital Rights Management (SPDRM'01), 2002, pp. 57-75.

* cited by examiner

Primary Examiner—Minh Dieu Nguyen
Assistant Examiner—Angela Holmes
(74) Attorney, Agent, or Firm—Rosenberg, Klein & Lee

(57) ABSTRACT

To identify participants in collusion directed to altering a digital fingerprint embedded in multimedia content, an ECC based fingerprinting technique establishes a code symbol for each of a plurality of segments of digital data forming the multimedia content. The code symbols are concatenated to form a fingerprint signal, which is subdivided into a plurality of subsegments for each segment in the digital data. The subsegments are permuted and embedded into the digital data. When a suspicious copy of the multimedia content is discovered, the permuted fingerprint signal is extracted from the content and inversely permuted to form a test fingerprint. The identity of one of the colluders is determined by correlation with characteristics of the codeword originally assigned to the user. The determination of identity may be enhanced by the addition of group data embedded as an additional fingerprint in the digital data. Joint consideration of coding and embedding provide benefits over previous fingerprinting techniques.

19 Claims, 18 Drawing Sheets

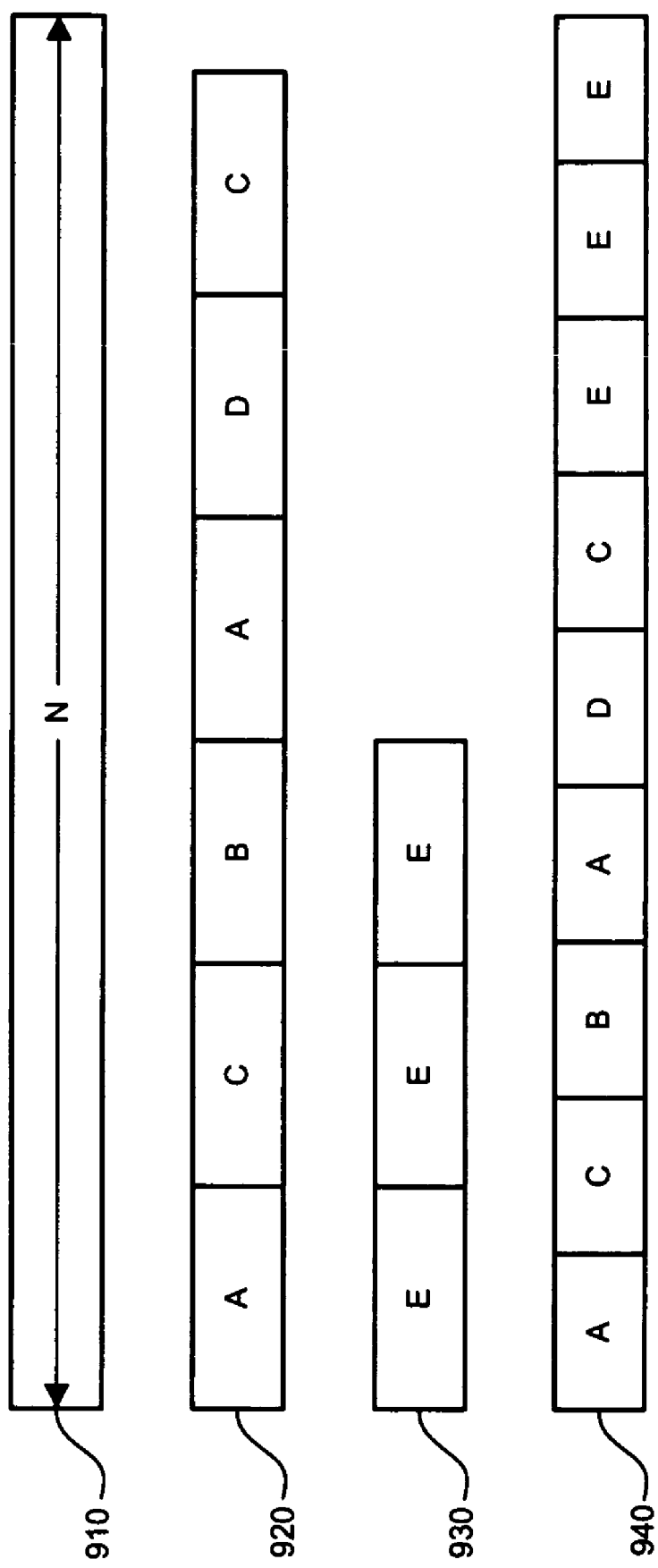

METHOD FOR FINGERPRINTING MULTIMEDIA CONTENT

RELATED APPLICATION DATA

This Application is based on a Provisional Patent Application, Ser. No. 60/642,286, filed on 7 Jan. 2005.

BACKGROUND OF THE INVENTION

1. Field of the Invention

The invention described herein is directed to detecting the unauthorized copying of multimedia content by recognition of a previously embedded fingerprint extracted from the digital data comprising the content. More specifically, the invention is directed to exploiting the interaction between the structure of a fingerprint code and the embedding of such code into multimedia content so that the embedded code can be used to identify one of a plurality of colluders of attempting to degrade the code's usability.

2. Brief Description of the Prior Art

Advancements in technology have made multimedia content easy to distribute for presentation. However, the ease with which multimedia content is distributed brings with it access by unauthorized users desiring to duplicate and redistribute it. In that protection of the content owner's property rights is essential to the content owner's financial bottom line, digital fingerprinting technology is being applied protect multimedia content from unauthorized dissemination. Fingerprinting digitally embeds a unique ID assigned to an authorized user into her copy of the content. The ID can be extracted from the content to help identify the originally assigned user of a suspicious copy when one is found or to prevent the presentation of the content if a fingerprint cannot be authenticated. In order to frustrate the detection of the embedded ID, however, groups of users collude to combine their respective copies of the content so as to generate an adulterated version having an altered fingerprint (referred to herein as a "colluded" copy). In this way, the colluding attackers protect their identities to avoid prosecution of infringement and other crimes. A fingerprinting system is considered collusion resistant when there is a high probability that one or more of the colluders can be positively identified from a suspicious copy of the fingerprinted multimedia content.

A growing number of collusion-resistant fingerprinting techniques have been recently implemented on multimedia. The most used methods fall mainly into one of two categories according to whether explicit discrete coding is involved. A typical example of non-coded fingerprinting is orthogonal fingerprinting, which assigns each user a spread spectrum sequence as a fingerprint. Each fingerprint sequence is typically orthogonal to the fingerprints of other users. The resistance to collusion by orthogonal fingerprinting is often improved by grouping together fingerprint sequences according to characteristics of users who are likely to collude together. However, while non-coded fingerprinting is easy to implement, the number of basis sequences required for its implementation and the computational complexity of detection increase linearly with the number of users assigned fingerprints.

Coded fingerprints take advantage of code modulation spread spectrum techniques and have been applied in the past to generic data, such as executable software programs and bitstreams. Prior art coding applications operated under a "marking assumption", which was introduced by Boneh and Shaw in "Collusion-secure Fingerprinting for Digital Data", *IEEE Trans. on Information Theory*, 44(5) pp. 1897-1905, 1998. The marking assumption assumes that colluders change only those fingerprint symbols in the colluders' corresponding codes that have different values. It is further assumed that the colluders assemble pieces of their codes that are different from the codes of other colluders in order to generate a new untraceable version. Numerous fingerprinting schemes have been developed base on the marking assumption to expand upon Boneh and Shaw's framework. For example, the "traceability (TA) code" may be constructed from structures resembling error correcting codes (ECC) and have been widely studied. Efficient decoding exists for some ECC, which makes such codes attractive for coded fingerprinting applications. As used herein, the coded fingerprinting scheme constructed under ECC principles will be referred to as "ECC based fingerprinting".

Referring to FIG. 1, there is illustrated a framework for coded fingerprinting in accordance with ECC based fingerprinting of the prior art. As is shown in the Figure, the ECC based fingerprinting system includes an ECC based coding layer 100 and a spread spectrum based embedding layer 190. The layers respectively occupy the fingerprinting stage 105, where the fingerprints are applied to the multimedia content 135, and a detection stage 195, where the fingerprint codes are acquired from a test copy 150 of the content. The two stages are coupled by a distribution channel 145, which may be a telecommunications channel or may be a market channel through which hard storage copy of the content, such as by a compact disk (CD) or digital versatile disk (DVD), is physically carried. One or more attackers 140 obtain the content somewhere along the distribution channel 145 to carry out the attack.

In the system of FIG. 1, each authorized user of the content is assigned a codeword, which is formed from ECC symbols selected from an alphabet of size q and having a large minimum distance. The encoder 110 partitions the content into a plurality of non-overlapped segments and encodes one symbol of the codeword in each segment. The partition can be made spatially into blocks for image, or temporally into frames for video and audio. The symbol is encoded as one of q mutually orthogonal spread spectrum sequences with identical energy via modulator 120. Embedder 130 adds the sequence corresponding to the symbol value to the host signal at the appropriate segment. The embedder 130 may add the sequences in accordance with perceptual scaling known in the art so that the fingerprint will be unnoticed during presentation of the multimedia content.

The fingerprinted multimedia content 135 is presented to the distribution channel 145 where it may be subject to an attack by one or more attackers 140. Suspicious multimedia content 150 is the presented to an extractor 160 which retrieves the spread spectrum sequence from the content. The sequence is demodulated by demodulator 170 to retrieve the code and decoder 180 returns the user ID corresponding to the assigned fingerprint code.

Most prior art systems have only considered the coding layer and justify minimizing the impact of embedding by reliance on marking assumptions. However, the distortions and attacks mounted by adversaries on fingerprinted multimedia can lead to errors in detecting fingerprint code symbols which are not accounted for by marking assumptions.

Previous research has given preference to ECC based fingerprinting over the orthogonal non-coded approach because some classes of ECC have more efficient decoding algorithms than the maximum likelihood decoding that is commonly used for orthogonal fingerprinting. However, while efficient decoding does improve the detecting efficiency, it only provides a relatively small improvement in computational complexity. The major improvement on the detecting efficiency actually comes from the demodulation process.

One way in which an attack is carried out is by "interleaving collusion", which is illustrated in FIG. 2, by which colluders contribute their assigned copies of the content segment by segment (or equivalently, symbol by symbol at the code level) with approximately equal share. A codeword for a user 1 was originally taken from codebook 210 and an ECC based codeword 220 was built thereon. A codeword 230 for user 2 was similarly constructed. Each colluding user 220, 230 then provides roughly an equal number of segments containing their corresponding symbols to a colluded version 240. Further distortion may be applied on the colluded signal, which is modeled as additive white Gaussian noise 250. At the detector side, the colluded codeword 260 is first extracted by demodulating symbols from each segment. The colluder is then identified by, for example, matching the extracted codeword with an entry in the codebook.

In another well-known type of collusion of collusion attack, the participants linearly combine their copies of the multimedia content to produce a colluded version. This generally reduces the energy in each contributed fingerprint until it is no longer discernible. Such collusion attacks are referred to herein as "averaging collusion" attacks.

An analytical approximation of the probability of detecting a single colluder, $P_d$, for the ECC based fingerprinting under interleaving and averaging collusion is graphically illustrated in FIG. 3A and FIG. 3B, respectively. The Watermark-to-Noise-Ratio (WNR) ranges from 0 dB to −20 dB, which includes the scenarios of severe distortion to mild distortion. The orthogonal fingerprinting case is shown in FIG. 3C and FIG. 3D for interleaving collusion and averaging collusion, respectively. Comparing the results of FIGS. 3B and 3D show that under averaging collusion, the orthogonal fingerprinting and ECC based fingerprinting constructed above have similar performance. They both resist at least a few dozens colluders' averaging attack under high WNR and about half dozen under low WNR. Thus, from colluders' point of view, averaging collusion for an ECC based fingerprinting system is not a very effective strategy. However, under interleaving collusion, as shown in FIG. 3A and FIG. 3C, a huge gap in the collusion resistance between the two systems is clearly shown. For orthogonal fingerprinting, the probability of colluder detection under interleaving collusion is the same as that under averaging collusion owing to the orthogonal spreading. At WNR=0 dB, the $P_d$ remains close to 1 when c is a few dozen and still near 0.9 even when c is as high as 140. On the other hand, the detection probability of the ECC based fingerprinting drops sharply when more than 6-7 colluders are involved in creating an interleaved copy, even when WNR is high. Thus, from the colluders' point of view, interleaving collusion is an effective strategy to circumvent the protection.

Careful examination of the two types of collusion shows that the difference in the resistance against them is derived from the role given to the embedding layer. The segment-wise interleaving collusion is equivalent to the symbol-wise interleaving collusion on the code level since each colluded segment comes from just one user. The collusion resilience primarily relies on what is provided by the code layer and bypasses the embedding layer. Because of the limited alphabet size, the chance of the colluders to interleave their symbols and create a colluded fingerprint close to the fingerprint of an innocent user is so high that if to handle this on the code level alone, it would require a large minimum distance in the code design. This means that either a code representing some given number of users can resist only a small number of colluders, or a code can represent only a small total number of users. On the other hand, for averaging collusion, every colluder contributes his/her share in every segment. Through a correlation detector, the collection of such contribution over the entire test signal leads to high expected correlation values when correlating with the fingerprints from the true colluders, and to low expected correlation when the fingerprints from innocent users. In other words, the embedding layer contributes to defending the collusion. This suggests that more closely considering the relation between fingerprint encoding, embedding, and detection is helpful to improve the collusion resistance against interleaving collusion.

When designing a fingerprinting system, a better trade-off between the collusion resistance and other performance measures such as detection computational complexity is desired. Although the orthogonal fingerprinting performs well in collusion resistance, its detection computational complexity and distribution cost are inhibiting. However, the significant computational advantages of ECC based fingerprinting provide motivation to find avenues to improve the collusion resistance of ECC based fingerprinting so as to reduce the performance gap between the ECC based and orthogonal fingerprinting while preserving its efficient detection and distribution.

SUMMARY OF THE INVENTION

According to one aspect of the invention, a method is provided for identifying a participant in production of an unauthorized version of multimedia content through a digital fingerprint embedded in digital data thereof. A codeword is assigned to each of a plurality of authorized users of the digital data. The codeword includes a plurality of symbols selected from a predetermined alphabet of symbols. The digital data is divided into a plurality of host data segments equal in number to the plurality of symbols forming the codeword. A fingerprint signal is encoded as a concatenation of digital code sequences corresponding to each symbol of the codeword. The fingerprint signal includes a plurality of fingerprint segments equal in number to the plurality of host data segments, whereby each of the fingerprint segments contains a corresponding one of the code sequences. The fingerprint segments are each segmented into a plurality of subsegments, which are then permuted and embedded into the digital data. A test fingerprint signal is subsequently extracted from a copy of the digital data and is segmented into the plurality of subsegments. The subsegments of the test fingerprint signal are inversely permuted with respect to the permutation of the subsegments of the fingerprint signal and the participant is identified as one of the authorized users assigned a codeword determined from the inversely permuted test fingerprint signal.

In another aspect of the invention, a participant in production of an unauthorized version of multimedia content is identified by a method that first forms a plurality of user codewords each corresponding to a concatenation of coding sequences. The user codewords are grouped into a plurality of groups such that the concatenation of coding sequences corresponding to each of the user codewords in a corresponding one of the groups is orthogonal to remaining ones of such concatenated coding sequences in the group. The user codewords are assigned to a corresponding one of a plurality of authorized users such that at least one characteristic of the user is common to other users assigned a user codeword from that group. The digital data is divided into a plurality of host data segments equal in number to the plurality of coding sequences. A fingerprint signal is encoded as the concatenation of code sequences corresponding to each of the user codewords. The fingerprint signal includes a plurality of fingerprint segments equal in number to the plurality of host data segments and each of the fingerprint segments contains a corresponding one of the code sequences. Each of the fingerprint segments are segmented into a plurality of subsegments and are permuted. The permuted fingerprint signal is embedded into the digital data. Subsequently, a test fingerprint signal is extracted from a copy of the digital data and is segmented into the plurality of subsegments. The test fingerprint signal is inversely permuted with respect to the permutation of the subsegments of the fingerprint signal and the participant is identified as one of the authorized users assigned a codeword determined from the inversely permuted test fingerprint signal.

In yet another aspect of the invention, each of a plurality of authorized users of the digital data is assigned a corresponding codeword including a plurality of symbols selected from a predetermined alphabet of symbols. Each symbol of the alphabet is encoded as a corresponding digital code sequence. The digital code sequences are segmented into a plurality of subsequences and the digital data of the multimedia content is segmented into a plurality of host data segments equal in number to the plurality of symbols forming said codeword, where each of the host data segments designated with a corresponding symbol of the codeword. Each of the host data segments is then segmented into a plurality of subsegments and each of the subsegments is designated with a portion of the symbol designated to the corresponding host data segment from which it was divided. A sub-segmented codeword is formed from the symbols designated to each of the subsegments, where the sub-segmented codeword is ordered identically to the order of the symbol portions of the designated subsegments. The sub-segmented codeword is then permuted. Each of the subsequences is embedded into a corresponding copy of each of the plurality of subsegments to produce a plurality of embedded subsegments equal in number to the number of symbols in the alphabet multiplied by the number of embedded subsegments. The embedded subsegments are concatenated in accordance with the permuted sub-segmented codeword to form a data signal and a test fingerprint signal is extracted therefrom such that the test fingerprint signal includes a plurality of subsegments equal in number to the number of subsegments in the sub-segmented codeword. The subsegments of the test fingerprint signal are inversely permuted with respect to the permutation of the subsegments of the sub-segmented codeword and the participant is identified as one of the authorized users assigned a codeword determined from the inversely permuted test fingerprint signal.

BRIEF DESCRIPTION OF THE DRAWINGS

FIG. 9B is a diagram of group coding by appending the group sub-codeword to the user sub-codeword in accordance with aspects of the present invention;

DETAILED DESCRIPTION OF PREFERRED EMBODIMENTS

It is an object of the present invention to prevent colluders from exploiting the code-level limitations of ECC based fingerprinting by way of interleaving collusion. The present invention takes advantage of existing code construction techniques and adds additional measures that will be referred to herein as "permuted subsegment embedding" or PSE. In that certain embodiments of the invention are implemented over ECC based fingerprinting, it is believed beneficial to first describe certain features and shortcomings of ECC based fingerprinting.

Figure 1:
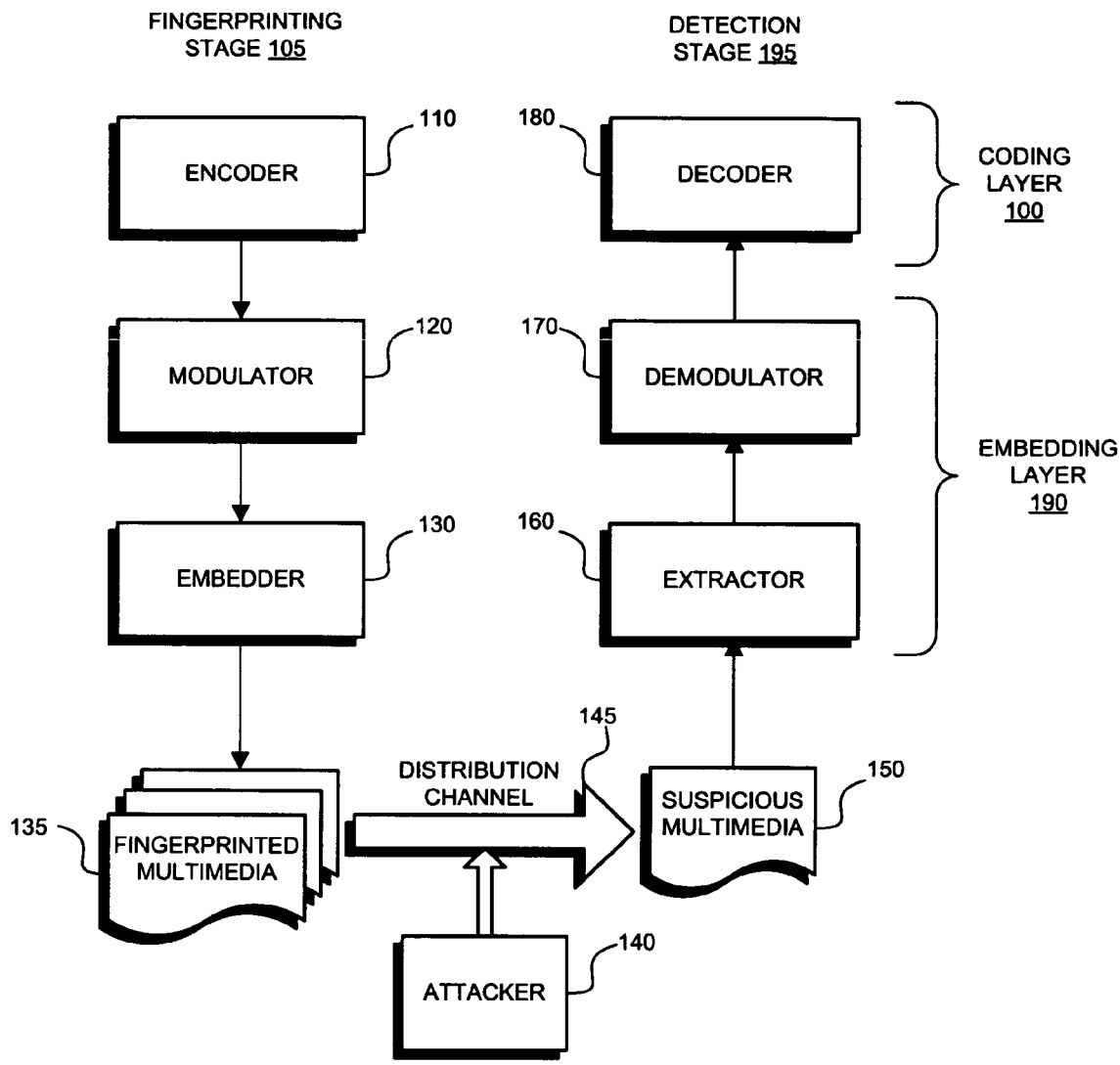
FIG. 1 is a schematic block diagram of an ECC based multimedia fingerprinting system.
Figure 2:
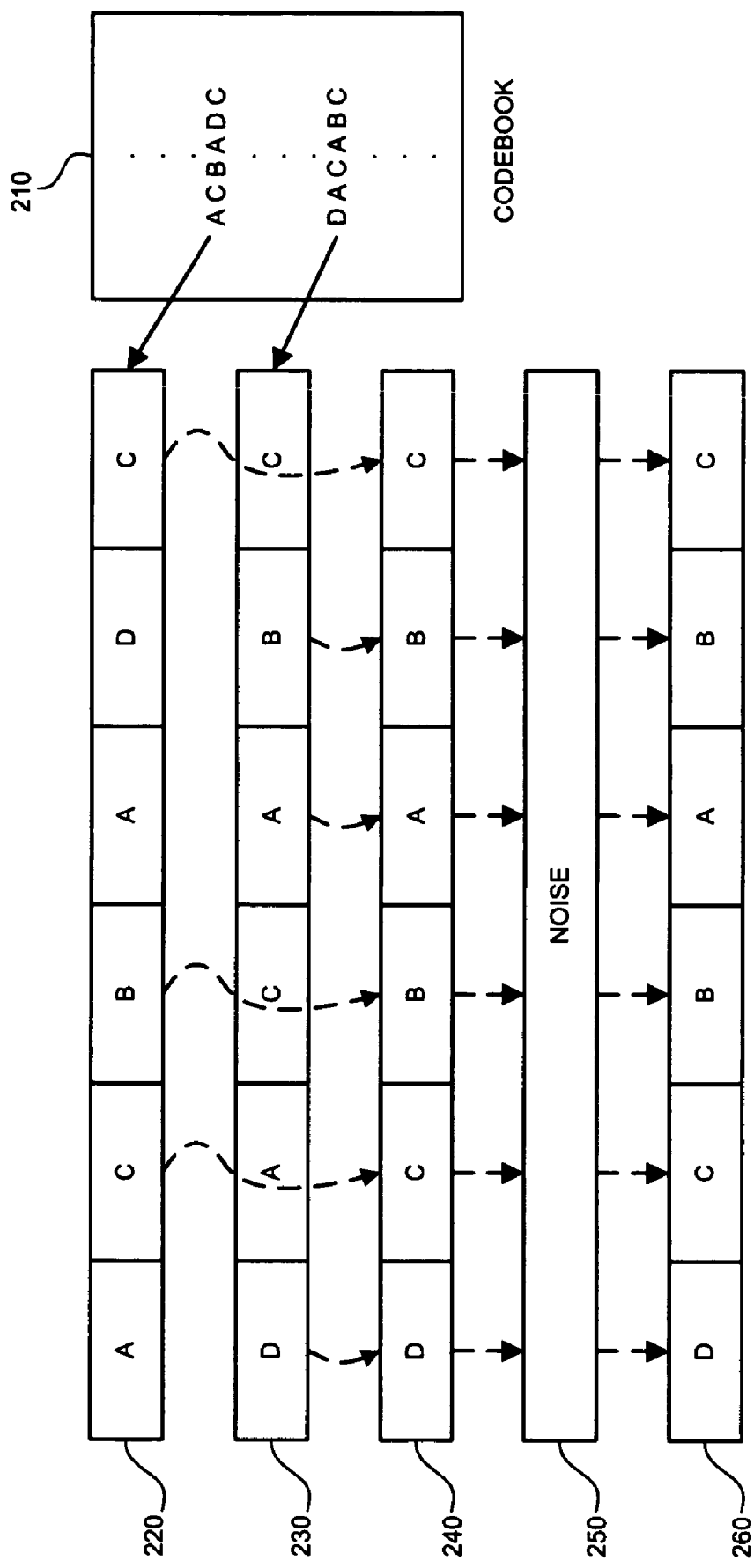
FIG. 2 is a diagram of an example of interleaving collusion.

In the system of FIG. 1, each fingerprinted segment can be modeled as $$y_{jk} = u_{sym(j,k)} + x_k \tag{1}$$

where $x_k$ is $k^{th}$ segment of host signal, and $y_{jk}$ is the $k^{th}$ fingerprinted segment for the $j^{th}$ user. The function $sym(j,k)$ is used to retrieve the symbol from the $k^{th}$ segment of the $j^{th}$ user's codeword, and $u_{sym(j,k)}$ is the spread spectrum sequence corresponding to the symbol value. The symbols are taken from a set of q mutually orthogonal spread spectrum sequences $\{u_i : i=1, \ldots, q\}$ with identical energy $\|u\|^2$. The concatenation of all fingerprinted segments ultimately forms the fingerprinted signal, whereas the concatenation of the spread spectrum sequences $u_k$, $k=1, \ldots, L$, where L is the length of the codeword, is referred to as the fingerprint signal.

In prior art multimedia fingerprinting systems, it is assumed that the colluders can only change the fingerprint code symbols where they see different fingerprint values in respective copies of the fingerprinted content. A colluded version of the code is constructed by assembling selected pieces of each colluder's codes. As previously stated, this technique is referred to as interleaving collusion and it is said the interleaving collusion occurs on the code level since the manipulation is on the code itself. Since few colluders are willing to take higher risk than any of the others, each participant in the collusion makes approximately equal contributions to the altered code.

In addition to interleaving collusion, colluders may manipulate fingerprinted multimedia in the signal domain, incurring a variety of code-domain changes that are inconsistent with the marking assumption. These signal domain attacks are said to occur on the embedding layer, since they manipulate the features of the signal without directly accessing the fingerprint code. A simple yet effective way alter the underlying fingerprint code is to average the corresponding signal components or features from multiple copies. This "averaging collusion" can be modeled as:

$$z = \frac{1}{c}\sum_{j \in S_c} s_j + x + d \qquad (2)$$

where $s_j$ represents the fingerprint sequence for user j, $S_c$ the colluder set, c the total number of colluders, x the host signal, and d the additive noise term. Studies have shown that a number of nonlinear collusion processes can be approximated by an averaging process with the addition of a noise term. For simplicity, the assumption is generally made that the additional noise in both interleaving and averaging collusion follows i.i.d. Gaussian distribution. The effects of other distortions have been studied in watermarking applications, such as quantization/compression and geometric distortions. When the original host signal is available, the effects of many distortions attempting to dilute the fingerprint can be approximated quite well by additive noise.

In the detection stage, it is desired to identify one of the colluders with high probability, i.e., a high $P_d$, the probability of identifying one colluder participating in the attack. To identify colluders who have contributed to produce the suspicious copy of the multimedia content, certain applications of ECC based fingerprinting first determine which symbol is present in each segment by using a correlation detector commonly used in spread spectrum applications. For example, if the original multimedia signal, or host signal, is available to the detection stage, the suspicious copy may be registered with the host signal and the host data subsequently subtracted from that of the suspicious copy to obtain a test signal. Then, for each segment of the test signal, a maximum correlation detector is used to identify the symbol. This can be done by correlating each of the q spreading sequences with the test signal and the sequence resulting in the highest correlation statistic indicates the corresponding symbol. The detection statistic for the $k^{th}$ segment may be, $$T_s(k, i) = \frac{(z_k - x_k)^T u_i}{\sqrt{\|u_i\|^2}}, i = 1, 2, \ldots, q, \qquad (3)$$

where $z_k$ and $x_k$ represent the $k^{th}$ segment of the colluded signal and that of the original signal, respectively. The extracted symbol from the $k^{th}$ segment is $$\hat{i} = \underset{i=1,2,\ldots,q}{\mathrm{argmax}} T_s(k, i). \qquad (4)$$

With the sequence of signals extracted from all segments using this maximum detector, a decoding procedure is applied to identify the colluder whose codeword has the most matched symbols with the extracted symbol sequence.

Alternatively, a soft-decision strategy may be employed to provide the correlation results of Equation (3) without having to determine each symbol value at every segment. The correlation is performed on all segments together to arrive at $$T_N(j) = \sum_{k=1}^{L} T_s(k, sym(j, k)) \; j = 1, 2, \ldots, N_u, \qquad (5)$$

where L is the code length and $N_u$ is the total number of users. The function sym(j, k) is used to retrieve the symbol from the $k^{th}$ segment of the $j^{th}$ user's codeword. This approach corresponds to a matched filter detector that correlates the entire test signal with each user's fingerprint sequence $s_j$ by $$T_N = \frac{(z - x)^T s_j}{\sqrt{\|s\|^2}} \; j = 1, 2, \ldots, N_u. \qquad (6)$$

Here, $\|s\|=\|s_j\|$ for all j based upon the equal energy constraint applied during fingerprinting. The user who is assigned the fingerprint code having the highest correlation value $T_N(j)$, i.e. $\hat{j}=\arg\max_{j=1, 2, \ldots, N_u} T_N(j)$, is identified as a colluder. Compared with the previously described 2-step hard decision scheme, the latter scheme takes advantage of the soft information on the symbol level and provides a better collusion identification performance.

It is to be noted that, under the above-framework, the non-coded orthogonal fingerprinting can be viewed as a special case of the alphabet size q equal to the total number of users $N_u$ and a codeword length of unity. The detection for orthogonal fingerprinting is done by first correlating the test signal with each user's sequence and then identifying the user with the highest correlation statistic as the colluder.

In certain embodiments of the invention, the fingerprint code design establishes a minimum distance between codewords to be large enough so as to determine the code regardless of collusion attack technique. The minimum distance requirement ensures that the best match with a colluded codeword, often referred in the art as the "descendant", comes from one of the true colluders.

Let $\Gamma \subseteq Q^L$ be a code over an alphabet Q with length L and total number of codeword $N_u$. Without loss of generality, the first c users will be established as the set of c colluders, denoted as $C=\{v_1, \ldots, v_c\} \subset \Gamma$, where a codeword $v_i \epsilon \Gamma$ is assigned to the $i^{th}$ colluder and consists of a concatenated sequence of L symbols $v_i=[w_1^{(i)} w_2^{(i)} \ldots w_L^{(i)}]$. A codeword set that descends from this colluder set is denoted as $$\mathrm{desc}(C) = \{[x_1 \ldots x_L] : x_j \epsilon \{w_j^{(i)} : 1 \leq i \leq c\}, 1 \leq j \leq L\} \qquad (7)$$

If for any descendant $[x_1 \ldots x_L] \epsilon \mathrm{desc}(C)$, there is a $v_i \epsilon C$ such that $$|\{j : x_j = w_j^{(i)}\}| > |\{j : x_j = S_j\}|, \qquad (8)$$

for any innocent user's codeword $[s_1 \ldots s_L] \epsilon \Gamma/C$ where the notation $|\bullet|$ is the cardinality operator, then $\Gamma$ is called a c-traceability (c-TA) code and denoted as c-$\mathrm{TA}_q(L, N_u)$ with q=|Q|.

Under the conventional marking assumption, a c-TA code can be constructed using an ECC if its minimum distance D satisfies $$D > \left(1 - \frac{1}{c^2}\right)L \qquad (9)$$

where c is the colluder number and L is the code length. It is then said that $\Gamma$ is a c-$\mathrm{TA}_q(L, N_u)$ code.

Most prior art systems have considered only the coding layer in designing collusion attack resistance and justify minimizing the impact of the embedding layer by reliance on marking assumptions. However, the distortions and attacks mounted by adversaries on fingerprinted multimedia can lead to errors in detecting fingerprint code symbols which are not accounted for by marking assumptions. Because of this, some of the existing work on c-TA code has been extended to tolerate erasures, i.e., data which is degraded to the point of being indistinguishable. The minimum distance to tolerate such erasures satisfies $$D > \left(1 - \frac{1}{c^2}\right)L + \frac{L_e}{c^2}, \quad (10)$$

where $L_e$ is the number of erasures.

There is a nontrivial probability for false alarms in symbol detection when non-erased erroneous symbols are introduced, where the introduction of such symbols occurs not through contribution by an attacker. The design of a resilient fingerprint code should account for such errors to minimize the false positives. To that end, the definition of c-TA code may be extended to account for both types of errors, i.e., tolerating $L_e$ erasures and $L_{FA}$ total errors and defining such c-TA code as c-$TA_q(L, N_u, L_e, L_{FA})$. The minimum distance required then becomes $$D > \left(1 - \frac{1}{c^2}\right)L + \frac{c+1}{c^2}L_{FA} + \frac{1}{c^2}L_e. \quad (11)$$

As is readily apparent from the previous discussion, ECC based fingerprint code prefers an ECC coding structure having larger minimum distance to identify a colluder from a larger set of participant colluders. The well-known Reed-Solomon code has the minimum distance that achieves the well-known Singleton bound and is used in existing coded fingerprinting works. Reed-Solomon codes may implement c-TA codes that satisfy the above conditions. In certain embodiments of the invention, a q-ary Reed-Solomon code of length L is used to construct a c-TA code with parameters satisfying $$N_u = q^t \text{ and } t = \left\lceil \frac{L}{c^2} - \frac{c+1}{c^2}L_{FA} \right\rceil. \quad (12)$$

Previous research has given preference to ECC based fingerprinting over the orthogonal non-coded approach because some classes of ECC have more efficient decoding algorithms than the maximum likelihood decoding commonly used in orthogonal fingerprinting applications. However, while selective decoding may improve the detecting efficiency, it only provides a relatively small improvement in the overall computational complexity. Aspects of the present invention are derived from the observation that the major improvement in detecting efficiency actually comes from the demodulation process.

For a fingerprinting system with a total of $N_u$ users and a host signal with length N, the detection of the orthogonal fingerprinting may be achieved by correlating the test signal with each user's fingerprint sequence. This takes $N_u N$ multiplications plus $N_u(N-1)$ summations, or a total of $O(N_u N)$ operations. Then, $N_u-1$ comparisons must be made to find the codeword corresponding to the highest correlation to identify at least one of the colluders. Thus the computational complexity of the whole detection process is $O(N_u N)+O(N_u)=O(N_u N)$. For ECC based fingerprinting, since the fingerprint sequences for each segment only have q different versions (corresponding to q symbols), only $qL(N/L)$ multiplications, $qL(N/L-1)$ summations and $L(q-1)$ comparisons must be performed resulting in a total computational complexity of $O(qN)$. In the decoding stage, a determination of the identity of the colluder may be achieved through $N_u-1$ comparisons by brute force searching, which provides an upper bound on the decoding complexity. Putting the demodulation and decoding steps together, the computational complexity for ECC based fingerprinting is $O(qN)+O(N_u)$. Generally, $N_u \ll N$, the demodulation part dominates the overall complexity, regardless of the use of efficient decoding algorithm. Therefore, the computational complexity becomes $O(qN)$. When Reed-Solomon codes are implemented, $N_u=q^t$, where t is the dimension of the code. The computational complexity of ECC based fingerprinting for detection becomes $O(t \sqrt[t]{N_u} N)$. The significant improvement in the demodulation process is a big advantage of ECC based fingerprinting over the orthogonal fingerprinting. Furthermore, q orthogonal sequences of length N/L are used in ECC based system, while the orthogonal system requires $N_u$ mutually orthogonal sequences of length N. This suggests that the ECC based system provides advantageous compactness in representing users and consumes fewer resources in terms of the orthogonal sequences. This implies a much more efficient generation of fingerprint sequences in the embedding and detecting stages.

In some applications, such as video streaming where a huge amount of data has to be transmitted to a large number of users in real time, the efficient generation and distribution of fingerprinted copies is a critical design objective. The ECC based fingerprinting provides a potential support to efficient distribution of the fingerprinted signal. In ECC based fingerprinting system, for a total of $N_u$ users, each segment is marked by one of only q possible symbols. To achieve fast generation of fingerprinted signal, q versions of each segment, each corresponding to a segment marked by each of the q symbols, is constructed in advance. The fingerprinted copy for each user is formed by concatenating the corresponding segments according to his/her codeword. For each segment, the content owner or trusted distributor multicasts q versions encrypted with q different message keys to all the subscribers. After verification, the distributor delivers the message keys to corresponding users who can then decrypt their fingerprinted signal. If B denotes the bandwidth requirement of sending only one copy, q copies would require bandwidth of qB and a bandwidth of $t\sqrt[t]{N_u}B$ if a Reed-Solomon code is employed.

By contrast, there is no similar structural advantage in orthogonal fingerprinting systems that allow such bandwidth reduction. The content owner or trusted distributor must generate the entire fingerprinted signal and unicast one of the $N_u$ different versions to each user, requiring thereby a bandwidth of $N_u B$.

As described above, for each user, a correlation-based statistic $T_N$ may be defined as $$T_N(j) = \frac{(z-x)^T s_j}{\sqrt{\|s_j\|}} \quad j=1, \ldots, N_u, \quad (13)$$

which follows multivariate Gaussian distribution of $N_u$ dimensions. Here, $s_j$ is the fingerprint sequence for user j, z is a colluded copy of the fingerprinted signal and x is the original signal. The statistics for collusion participants, $T_1$ and innocent users, $T_2$, may be defined as, $$T_1 = \max_{j \in S_c} T_N(j) \text{ and } T_2 = \max_{j \notin S_c} T_N(j) \quad (14)$$

where $S_c$ is the colluder set. For simplicity, $T_1$ and $T_2$ are approximated to be independent Gaussian distributed. Examination of the distribution of the correlations between each fingerprint sequence and the test sequence under interleaving collusion shows that the mean and variance of $T_1$ and $T_2$ may be expressed as:

$$m_{T_1} \triangleq E[T_1] = \frac{\|u\|}{\sqrt{L}} \left( \frac{L}{c} + \frac{5(c-1)(L-D)}{12} \right), \quad (15)$$

$$\sigma_{T_1}^2 \triangleq \text{Var}[T_1] = \frac{\|u\|^2}{L} \sigma_C^2 + \sigma_d^2$$

$$m_{T_2} \triangleq E[T_2] = \frac{\|u\|}{\sqrt{L}} \times \frac{c(L-D)+1}{2}, \quad (16)$$

$$\sigma_{T_2}^2 \triangleq \text{Var}[T_2] = \frac{\|u\|^2}{L} \sigma_I^2 + \sigma_d^2$$

$$\text{with } \sigma_I^2 = \left( \frac{c(L-D)-1}{6} \right)^2 \text{ and } \sigma_C^2 = \left( \frac{5(c-1)(L-D)}{36} \right)^2, \quad (17)$$

where $\|u\|$ is the strength of the spread spectrum sequence corresponding to each symbol in the alphabet of fingerprint codes, L is the length of the fingerprint code, D is the minimum distance between symbols in the alphabet, c is the number of colluders and $\sigma_d^2$ is the variance of the additive noise. Then, $$P_d = Pr(T_1 > T_2) = \int_{-\infty}^{28} P(T_1 > t) f_{T_2}(t) dt, \quad (18)$$

where $f_{T_2}$ is the p.d.f of $T_2$ and $$P(T_1 > t) = 1 - Q\left( \frac{t - m_{T_1}}{\sigma_{T_1}} \right). \quad (19)$$

In certain embodiments of the invention, system performance is determined by a pairwise correlation denoted as $\rho$. Without loss of generality, the first c users are assumed to perform the averaging collusion. The vector of detection statistics $T_N$'s follows a $N_u$-dimensional Gaussian distribution:

$$T = [T_N(1), \ldots, T_N(N_u)]^T \sim N([m_1, m_2]^T, \sigma_d^2 \Sigma), \quad (20)$$

$$\text{with } m_1 = \|s\| \left( \frac{1}{c} + \left(1 - \frac{1}{c}\right) \rho \right) 1_c, \quad m_2 = \|s\| \rho 1_{n-c},$$

where $1_k$ is an all-1 vector with dimension k-by-1, and $\Sigma$ is an n-by-n matrix whose diagonal elements are 1's and off-diagonal elements are $\rho$'s, $\sigma_d^2$ is the variance of the noise, $m_1$ is the mean vector for colluders and $m_2$ is the mean vector for innocent users. Given the same colluder number c and fingerprint strength $\|s\|$, the mean correlation values for colluders and for innocents are separated more widely for a smaller $\rho$. Thus, absent any prior knowledge of the collusion pattern, a smaller $\rho$ leads to a larger colluder detection probability $P_d$.

Therefore, fingerprint sequences with a small pairwise correlation $\rho$ are preferred in designing a fingerprinting system.

The pairwise correlation of ECC based fingerprinting can be determined by examining the code construction. Codes with a larger minimum distance have a smaller upper bound on the correlation and thus are more preferable. Under the code construction with small minimum distance, the largest pairwise correlation between the fingerprinting sequences $\rho_o$, which corresponds to the codewords with minimum distance, will be close to 0. The equal pairwise correlation model described above can be used with $\rho = \rho_o$ to approximate the ECC based fingerprinting under averaging collusion.

For an L-tuple q-ary Reed-Solomon code of dimension t, the total number of codewords is $N_u = q^t$ and the minimum distance $D = L - t + 1$. Taking $s_i$ and $s_j$ to represent the fingerprint sequences for user i and user j, respectively, and $w_{ik}$ as the orthogonal sequence representing the symbol in user i's codeword at position k with $\|w_{ik}\| = \|w\|$, the normalized correlation between $s_i$ and $s_j$ is $$\frac{\langle s_i, s_j \rangle}{\|s\|^2} = \frac{\langle [w_{i1}, w_{i2}, \ldots, w_{iL}], [w_{j1}, w_{j2}, \ldots, w_{jL}] \rangle}{L \|w\|^2} \quad (21)$$

$$= \frac{\sum_{k=1}^{L} w_{ik} w_{jk}^T}{L \|w\|^2}$$

$$\leq \frac{L - D}{L}$$

$$= \frac{t - 1}{L}$$

$$\triangleq \rho_o.$$

The choice of t and L ensures that $\rho_o$ is close to 0. By doing so, the ECC based fingerprinting and the orthogonal fingerprinting should have comparable resistance against averaging collusion.

Figure 4:
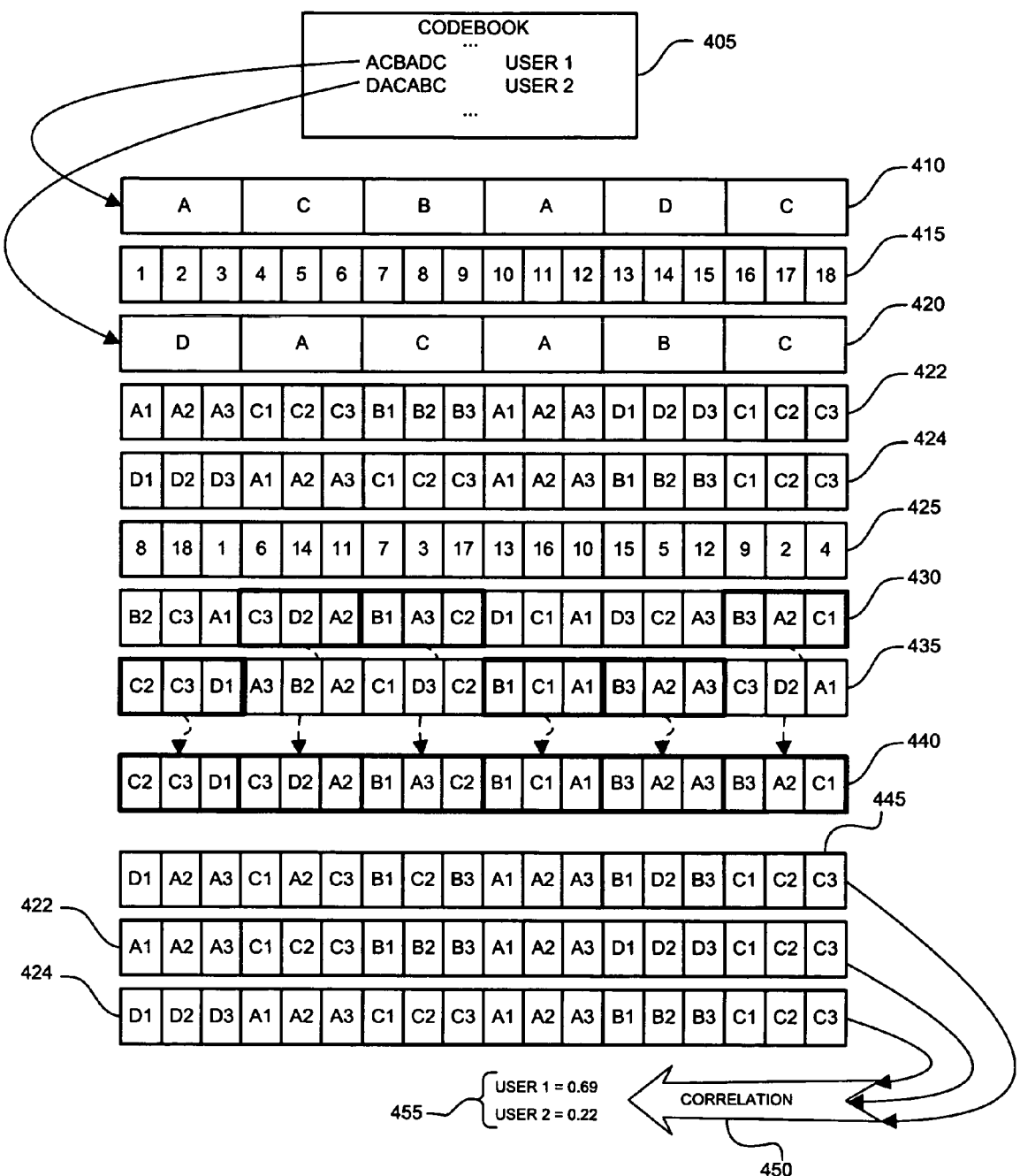
FIG. 4 is a diagram of permuted segment embedding (PSE) of ECC based fingerprint codes in accordance with the present invention.

Having now described exemplary ECC based fingerprint, which may serve as a basis for the present invention, exemplary embodiments of PSE will now be described. Referring to FIG. 4, there is shown fundamental concepts of an exemplary PSE process in accordance with the present invention. A fingerprint signal 410, 420 is generated by concatenating the spreading sequences corresponding to the symbols in a user's codeword. As is shown in the Figure, the codewords, formed in accordance with an ECC based fingerprinting system, are maintained in a codebook 405. Each original segment of the fingerprint signal is then divided into β subsegments, as shown at 422 and 424, giving a total of β L subsegments. The subsegments of each of fingerprint sequences 410 and 420 are randomly permuted, as illustrated at 425, to obtain the corresponding final fingerprint signals 430 and 435, respectively. In certain embodiments, the permutation is randomized in accordance with a secret key. If interleaving collusion were then to proceed as previously described, the resultant descendant fingerprint would be that shown at 440. In the detection stage, the extracted fingerprint signal 440 is inversely permuted, as shown at 445. The fingerprint signal 445 is then presented to a correlation detector, as shown at 450, where it is correlated with the original fingerprints 422 and 424, to produce a detection statistic 455 for each user.

The detection statistic $T_N$ for the PSE system under interleaving collusion is modeled as an $N_u$-dimensional Gaussian distribution:

$$T_N \sim N([m_1, m_2], \sigma_d^2 \Sigma) \qquad (22)$$

with $$m_1 = \left(\left\lfloor \frac{\beta L}{c} \right\rfloor + \left\lfloor \frac{L-D}{L}\left(\beta L - \left\lfloor \frac{\beta L}{c} \right\rfloor\right)\right\rfloor\right)\frac{\|s\|}{\beta L}, \text{ and} \qquad (23)$$

$$m_2 = \left\lfloor \frac{L-D}{L}L\beta \right\rfloor \frac{\|s\|}{\beta L} = \frac{L-D}{L}\|s\|, \qquad (24)$$

where $\Sigma$ is as described above for averaging collusion with $\rho = (L-D)/L$. The variable $\beta$ then serves as a parameter that controls the similarity of the PSE detection results to those of the averaging collusion detection. As will be shown, larger $\beta$ provides a finer granularity in subsegment division and permutation.

With subsegment partitioning and permutation, each colluded segment after interleaving collusion most likely contains subsegments from multiple users, which may be observed by correlation-based detectors (including both hard and soft detection at the symbol level). This is similar result to that brought about by averaging collusion. Since averaging collusion is far less effective from the colluder's point of view, the permuted subsegment embedding can greatly improve the collusion resistance of ECC based fingerprinting under interleaving collusion. Even if the colluders know the actual size of a segment or a subsegment, the permutation being unknown to them prevents them from creating a colluded signal with the equivalent effect of symbol interleaving in the code domain.

Figure 5:
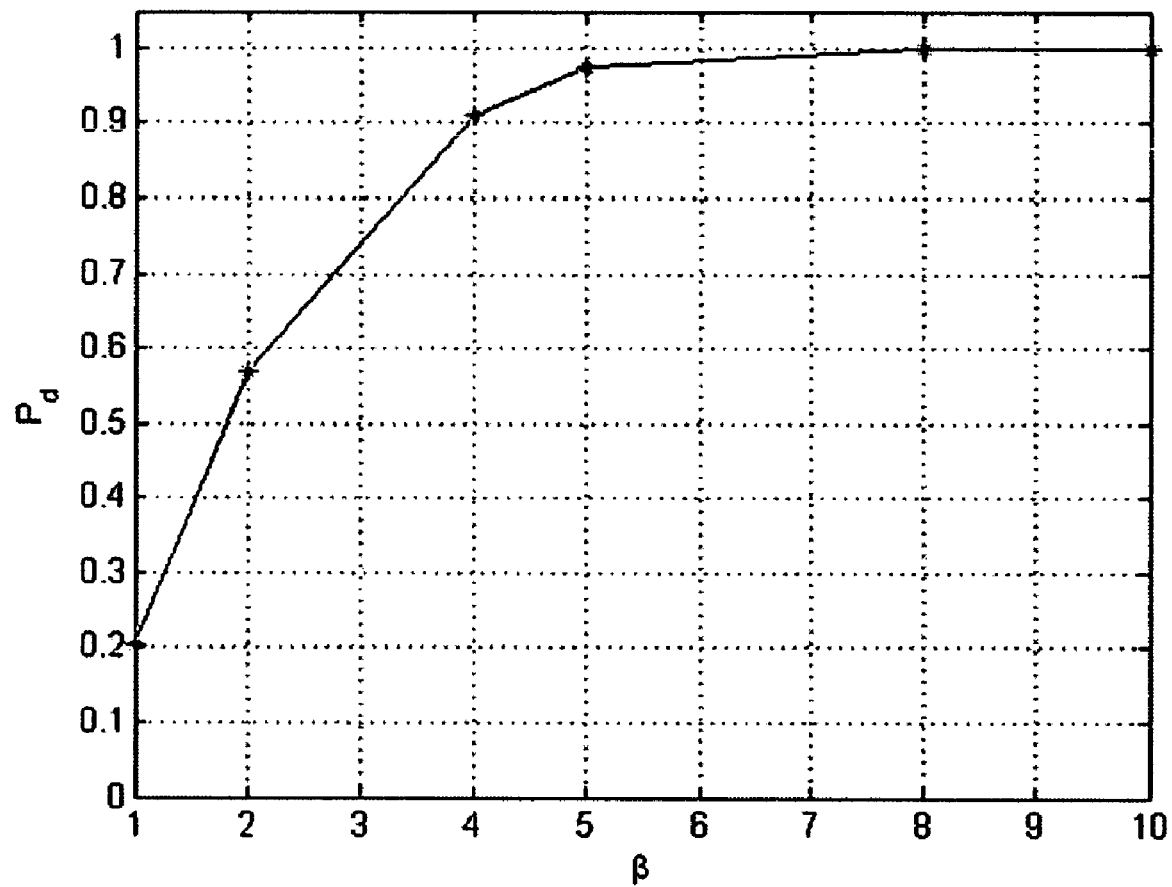
FIG. 5 is a graph of probability of detecting of a single participant in interleaving collusion on a PSE fingerprinting system of the present invention as measured against the number of subsegments implemented.

The parameter $\beta$ controls the "approximation" level of the effect of interleaving collusion to that of averaging collusion. Larger $\beta$ provides a finer granularity in permutation. Thus, each segment may contain subsegments from more colluders, leading to higher similarity to averaging collusion detection and better collusion resistance. FIG. 5 shows the effect of the probability of detecting a colluder participating in segment-wise interleaving of the PSE system of the present invention, with variable values of $\beta$, for c=25 colluders and WNR=0 dB. The Figure reveals that a higher $\beta$ gives higher detection probability $P_d$. On the other hand, a larger $\beta$ may incur higher computational complexity in permutation. Thus a tradeoff should be made according to the requirements of a specific application.

Figure 3B:
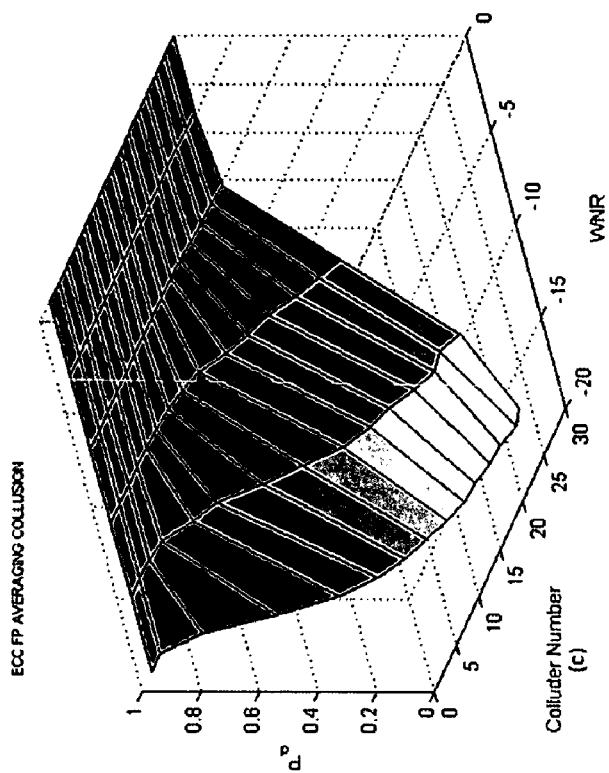
FIG. 3A-B are graphs of the probability of detecting of a single participant in interleaving and averaging collusion on an ECC based fingerprinting system.
Figure 3A:
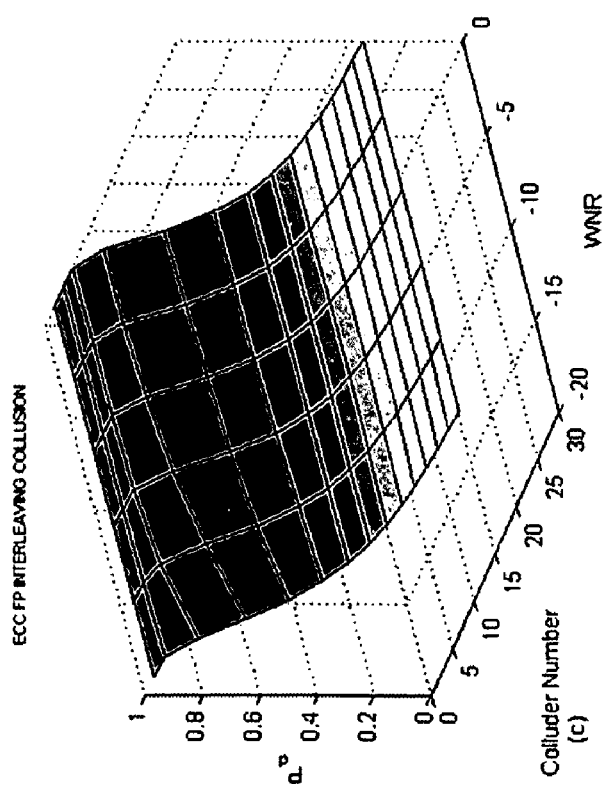
Figure 3D:
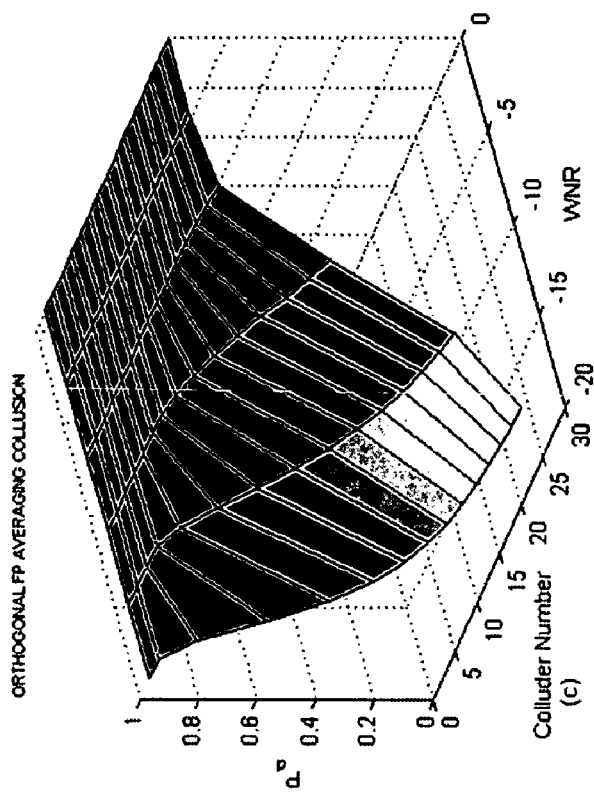
FIG. 3C-D are graphs of the probability of detecting of a single participant in interleaving and averaging collusion on an orthogonal fingerprinting system.
Figure 3C:
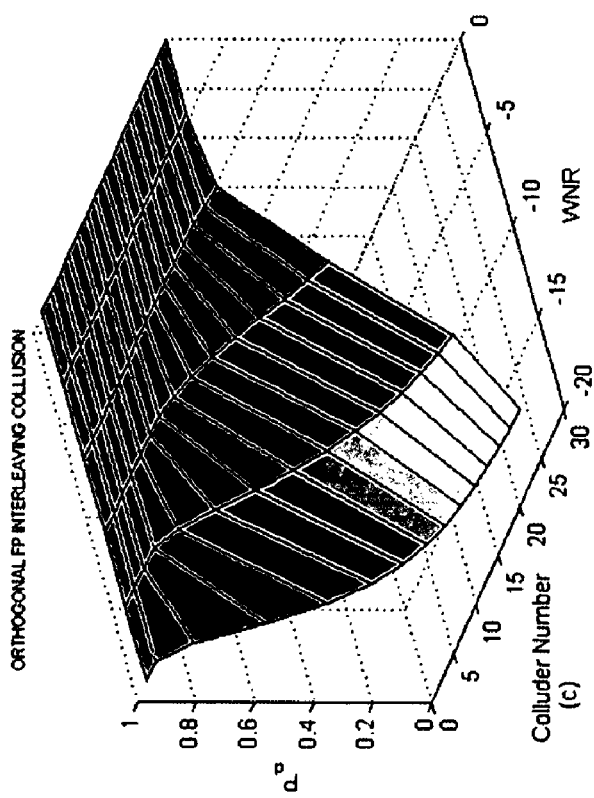
Figure 6B:
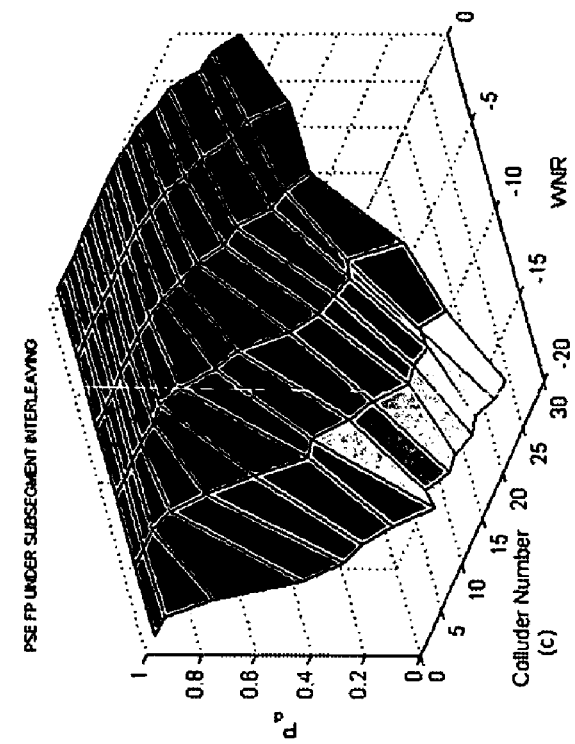
FIG. 6B is a graph of the probability of detecting a single participant in subsegment interleaving collusion on a PSE fingerprinting system of the present invention.
Figure 6A:
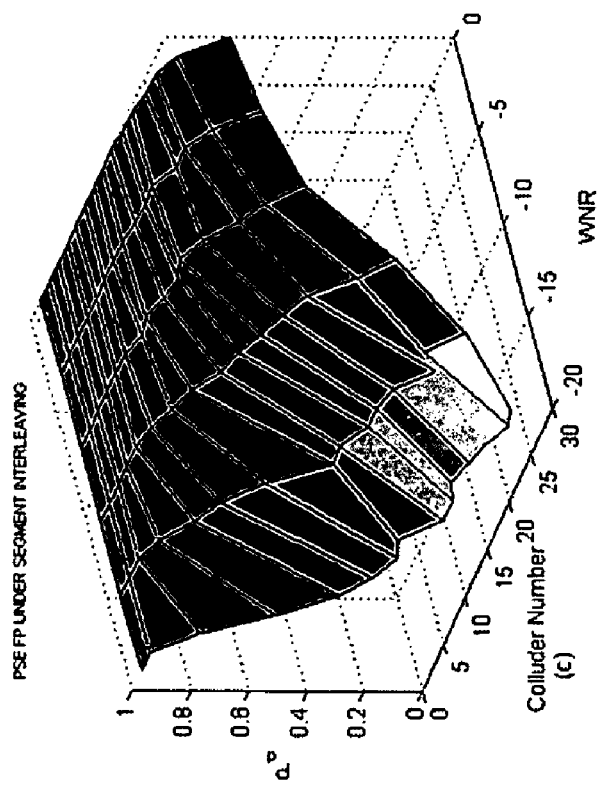
FIG. 6A is a graph of the probability of detecting of a single participant in segment interleaving collusion on a PSE fingerprinting system of the present invention.

Referring to FIG. 6A-6B, there are shown graphs illustrating the effectiveness of certain aspects of the invention. The PSE process was evaluated with $\beta=5$ under various WNRs. FIG. 6A shows colluder detection probabilities for segment-based interleaving collusion. As is clearly observed, the detection probability of the present invention is substantially improved over the original ECC based fingerprinting system when both processes are subjected to the interleaving collusion shown in FIG. 3A. The difference in performance between the present invention and that of the orthogonal fingerprinting is very small as shown by comparing FIG. 6A with FIG. 3C. FIG. 6B illustrates the detection probability for subsegment based interleaving collusion. FIGS. 6A-6B show that the detection performance under interleaving collusion using a subsegment as a unit and using a segment as a unit are similar and give a high detection probability for up to two dozen colluders at moderate to high WNR. Since the permuted subsegment embedding does not affect the performance of the system under averaging collusion, the $P_d$ under averaging collusion remains unchanged. Overall, the PSE process of the present invention, which jointly considers coding and embedding layers, has effectively improved the collusion resistance.

The detection in the exemplary PSE fingerprinting includes three steps: inverse permutation, demodulation by correlation and decoding to a certain colluder. The computational complexity of the inverse permutation is $O(\beta L)$ and, as previously discussed, the demodulation and decoding steps require at most $O(qN)+O(N_u)$ computations. In total, PSE fingerprinting requires $O(\beta L)+O(qN)+O(N_u)$. The largest possible value of $\beta L$ is N, and usually $N_u \ll N$. Thus, the demodulation step still dominates the overall complexity. Therefore, the overall computational complexity remains at $O(qN)$.

It is to be noted that there are only q different versions for each subsegment in the PSE fingerprinting process of the present invention. The multicast distribution of fingerprinted signal previously described for ECC based fingerprinting remains applicable except that the unit multicast to the different users is a subsegment rather than a segment. The bandwidth consumption remains unchanged.

The efficient distribution may, in certain embodiments of the invention be achieved by dividing each sequence corresponding to every symbol in the alphabet into the same number $\beta$ of subsequences. Each of the subsequences may be stored or transmitted to another location where fingerprinted versions of the multimedia content may be assembled. In any case, the subsequences are embedded into copies of each of the subsegments of the host signal to produce q different versions of the subsegment. Thus, the embedded subsegments are preformed to minimize impact on bandwidth, as previously discussed. In certain embodiments of the invention, the subsegments as embedded with the subsequences may be assembled in accordance with a permuted codeword, which may be inversely permuted at various points along the distribution channel when it is suspected that one or more embedded subsegments have fallen prey to attackers. When inversely permuted, the fingerprint signal may be processed as described above to reveal the identity of the attacker.

Among the beneficial features of the permuted subsegment embedding of the present invention is the significant improvement in collusion resistance over ECC based fingerprinting with only a marginal increase in computation cost. Additionally, the PSE fingerprinting may take advantage of the efficient distribution by pre-forming the subsegments. Moreover, adjustments to user capacity can be made by modifying the dimension of the base ECC, e.g. the t of Reed-Solomon code.

It is known in the fingerprinting field that an unscrupulous user is not equally likely to collude with just any other user. It is more likely that users having similar characteristics, say, that live in the same geographic area or have similar social or cultural backgrounds, are more likely to cooperate in a collusion attack than with other users. Thus, users may be assembled into groups according to some prior knowledge and additional information may be added to each user's copy to facilitate detection. From FIG. 3A, it is observed that as WNR increases from −20 dB to 0 dB, the detection capability of ECC fingerprinting increases only marginally compared with the huge increase afforded orthogonal fingerprinting. Thus, as the WNR increases, the performance bottleneck to symbol detection accuracy lies in the coding layer. This provides motivation to use part of the fingerprint energy for embedding additional information so as to facilitate colluder detection, while keeping the symbol detection accuracy sufficiently high. The process by which this is done in the present invention is referred to herein as Group Based Joint Coding and Embedding (GRACE) fingerprinting.

As is known in the art, fingerprint codewords may be placed into groups in accordance with common characteristics of authorized users based on the prior knowledge or assumptions on expected collusion patterns. Symbols representing the group information are added to the fingerprint, where the added information will be referred to herein as a "group sub-codeword". In embodiments which include grouping, the codeword that is assigned to each user will be referred to as a "user sub-codeword".

Figure 7:
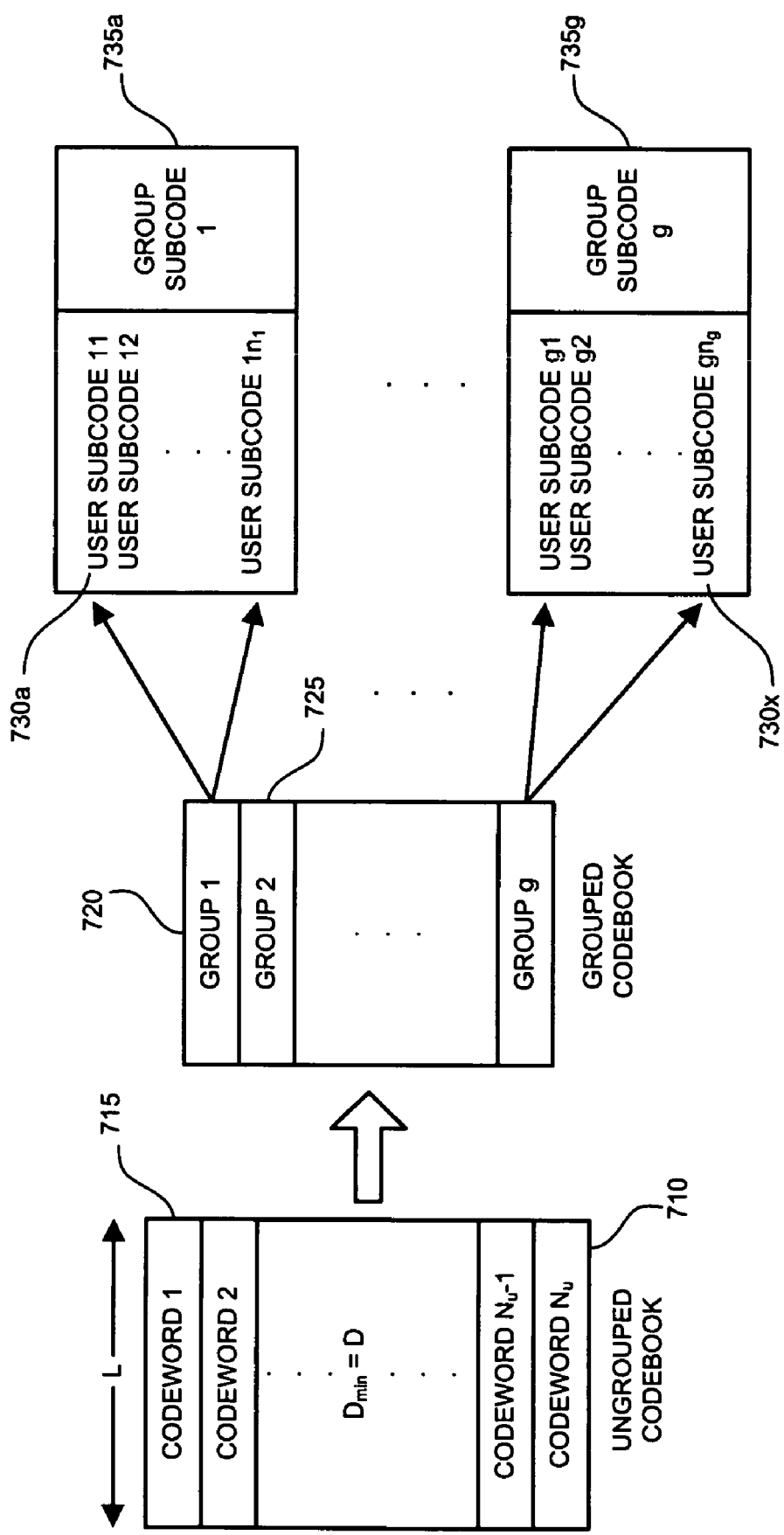
FIG. 7 is a block diagram illustrating fundamental aspects of group coding of fingerprints in accordance with the present invention.

Referring to FIG. 7, prior to assigning codewords to users, a fingerprint codebook C, illustrated at 715, is formed from error correcting codes over an alphabet of size q, such as the ECC based codes previously described. The code length is L, and the minimum distance is D, which is typically less than L. The codebook 715 is arranged into groups 725 to form a grouped codebook G, illustrated at 720. Each user sub-codeword 730a-730x is grouped so that the codewords of any particular group 725 are orthogonal to each other. Thus, users within a group are assigned codewords having distinct values at each symbol position and the group sub-codewords 735a-735g may be subsequently assigned to the group attribute. The code distance within a group equals the codeword length L.

Figure 8:
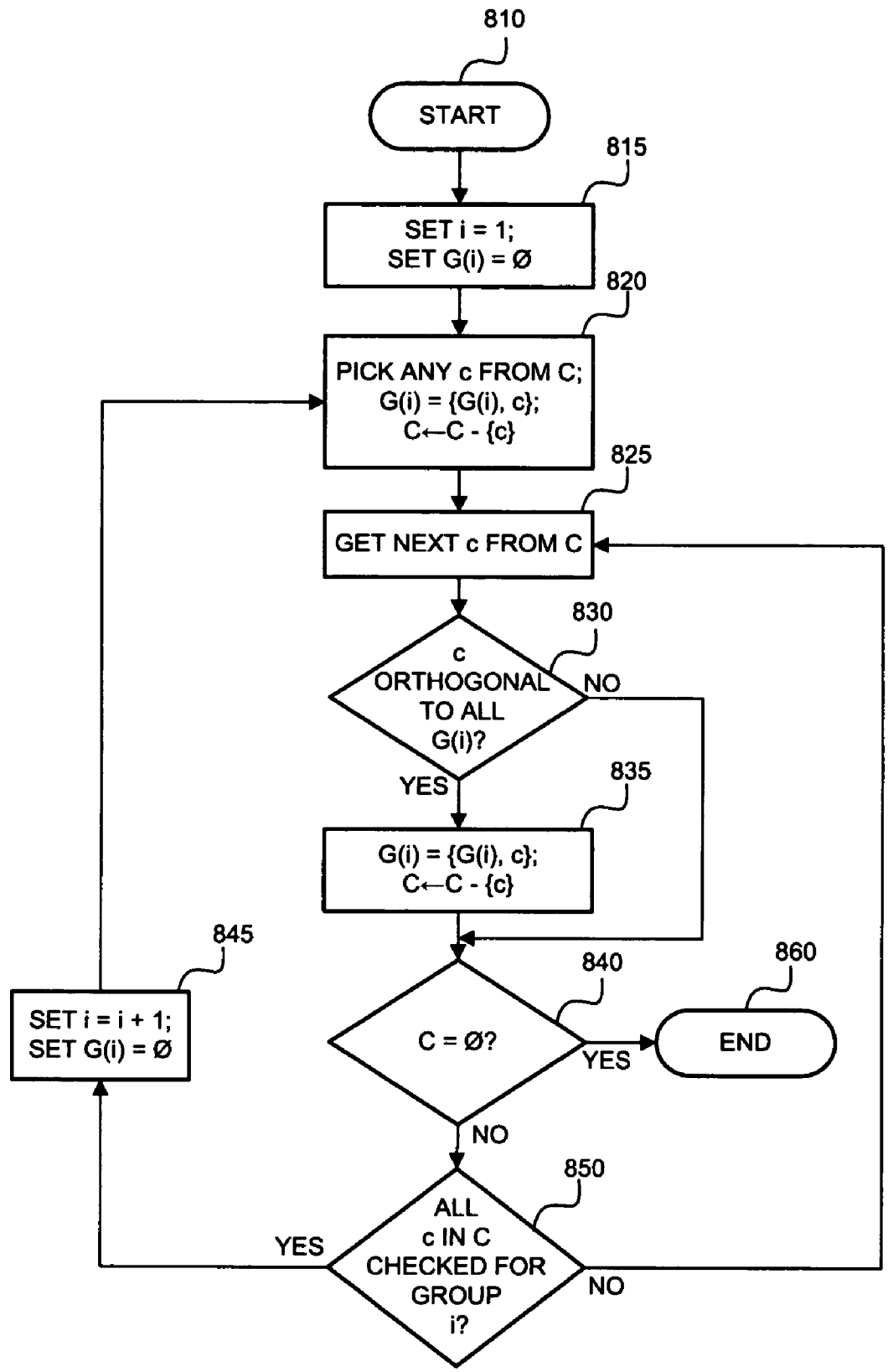
FIG. 8 is a flow diagram of fundamental method steps for partitioning a codebook into groups in accordance with the present invention.

An exemplary process for grouping codewords orthogonally is illustrated in FIG. 8. The process is entered at block 810 and flow is transferred to block 815, where the group index is initialized, i=1, and the set of codewords for group i is initialized to the empty set, G(i)=Ø. The process continues at block 820, where an arbitrary codeword c∈C is selected as the first element for group i. The code c is moved from C to group i. At block 825, a codeword c∈C is selected and it is determined at block 830 if the codeword is orthogonal to all the existing codewords in G(i). If so, the process flow is transferred to block 835, where the codeword c is moved from C to the group i, G(i), a step that is skipped if c is not orthogonal to other codewords c in G(i). The process continues at block 840, where it is determined if the codebook C is empty. If not, flow is transferred to block 850, where it is determined if all c∈C have been checked for orthogonality. If all codewords have been checked, the process continues at block 845, where the index i is incremented and the next group G(i) is set to the empty set. The process then continues at block 820 so as to build the next group. If it is determined at block 850 that more codewords need to be checked, flow is transferred back to block 825, where the next codeword is retrieved. Once it is determined at block 840 that the codebook C is empty, the process ends at block 860.

In certain embodiments of the invention, the group sub-codewords themselves are designed to be orthogonal to one another. In one simple embodiment, the group sub-codeword is a single symbol and g symbols would represent g groups. For each group, the symbol representing the group is repeated L times to form a group codeword, thereby ensuring that the symbol representing the group sub-codeword is embedded into each segment of the host signal.

In the GRACE fingerprinting scheme of the present invention, both the group sub-codeword and user sub-codeword are embedded into the host signal by mapping them to spreading sequences and then combining them with the host signal. In the signal domain, the group information in accordance with embodiments of GRACE is orthogonal to and overlaps the spreading sequence conveying the user sub-codeword. More specifically, the sequences $\{u_j, j=1 \ldots q\}$ are used to represent q symbol values in the alphabet of user sub-codewords, where $u_j$'s are orthogonal to each other and have identical energy $\|u\|^2$. The g sequences $\{a_i, i=1 \ldots g\}$ representing g groups are orthogonal to each other and to $\{u_j\}$ and have the same energy as $u_j$'s i.e. $\|a\|^2 = \|u\|^2$. The fingerprint signal representing symbol in the $j^{th}$ segment of user k who belongs to group i is constructed as $$s_{ijk} = \sqrt{1-\rho}\, u_{sym(j,k)} + \sqrt{\rho}\, a_i, \quad (18)$$

where function sym(kj) is used to retrieve the $k^{th}$ symbol in $j^{th}$ segment, $\rho$ is used to adjust the relative energy between the group sub-codeword and user sub-codeword. This fingerprint signal is added to the $j^{th}$ segment of the host signal. A higher $\rho$ provides a more accurate detection of group information, but reduces the accuracy of user sub-codeword detection, which may lead to low accuracy of colluder detection, and vice versa. Since L segments are available to collect the energy for group detection and since collusion usually happens among a small number of groups, small $\rho$ may be chosen to guarantee the user codeword detection with an acceptable group detection accuracy.

Figure 9A:
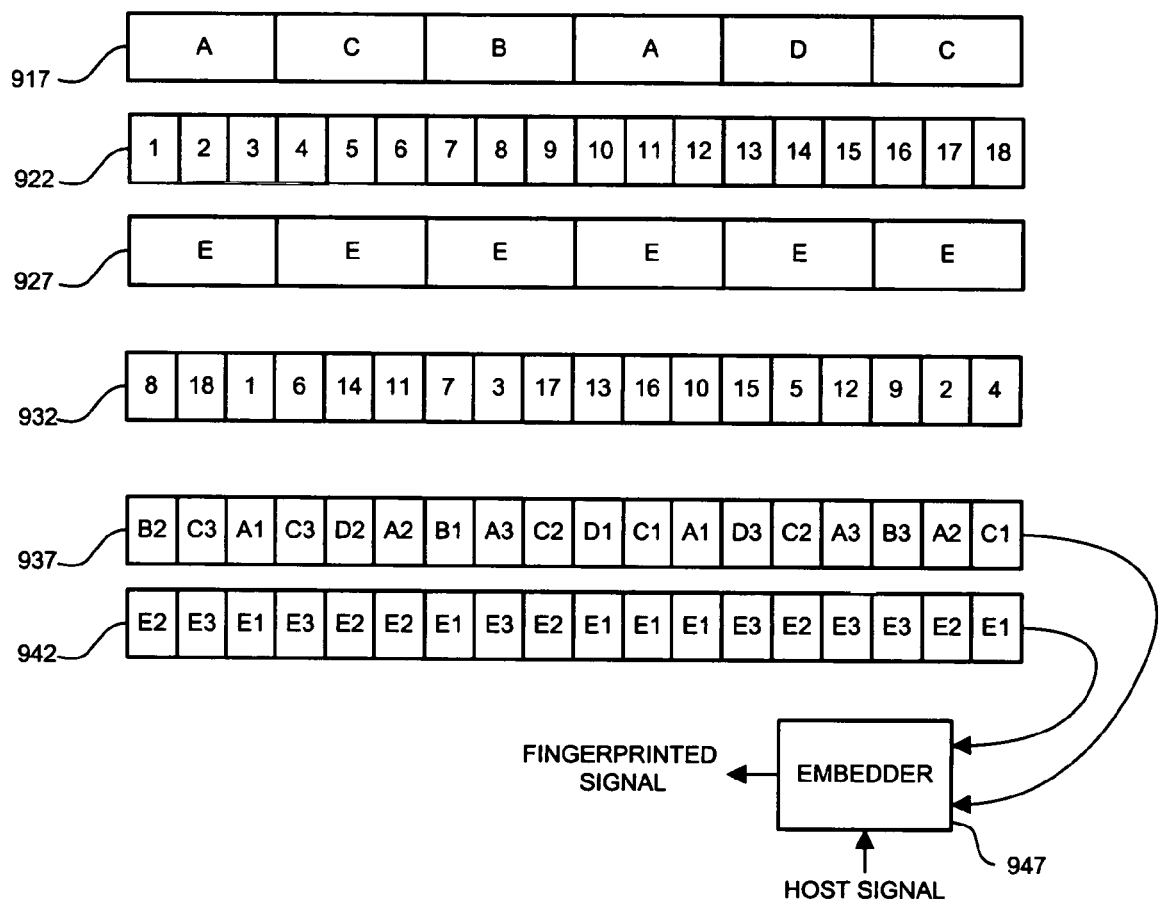
FIG. 9A is a diagram of group based joint coding and embedding (GRACE) in accordance with the present invention.

In certain embodiments of the invention, the GRACE fingerprinting scheme embeds the spreading sequence of the group sub-codeword over that of the user sub-codeword so that the group information is spread throughout the signal. Such process is illustrated in FIG. 9A, where a user sub-codeword 917 may be divided into subsegments, as previously described. A group sub-codeword 927 is shown as being composed of a number of different symbols, however the group sub-codeword may be composed of repeated version of the same symbol, as previously described. The user sub-codeword 917 and the group sub-codeword may be divided into a plurality of subsegments 922. In certain embodiments of the invention, the user sub-codeword 917 and the group sub-codeword 927 are randomly permuted, as illustrated at 932. A permuted fingerprint sequence is produced according to the permuted subsegments 937 and the group fingerprint sequence 937 and 942. The fingerprint sequences 937, 942 are then presented to the embedding layer 947, where they are embedded into the host signal to produce the fingerprinted signal.

In other embodiments of the invention, the group information is embedded by appending the spreading sequence of group sub-codeword to that of user sub-codeword, as shown in FIG. 9B. As is shown in the Figure, the total sample budget of the host signal 910 for purposes of fingerprinting is N. The length in symbols of the user codeword 920 is L and the length in symbols of the group sub-codeword 930 is $L_g$. The segment length is adjusted to accommodate appending the group sub-codeword to the user sub-codeword, as illustrated at 940. As is shown, for a given host signal where N is fixed, the longer the group sub-codeword $L_g$ is, the smaller each segment length $N'_s = N/(L+L_g)$ must be. The length of the group sub-codeword, $L_g$, regulates the relative energy between the group sub-codeword 930 and user sub-codeword 920. During the detection stage, the group symbols may be extracted from their corresponding positions through a non-blind correlation detector, where the correlation is done over all the segments containing the group sub-codeword. The groups are considered guilty of collusion if the detection statistics of the test signal are greater than a certain threshold. A set of guilty groups may be determined by the union of the detected guilty groups.

It should be noted that for the appending embedding strategy, all the users inside one group have the same group codeword with length $L_g$, i.e. they have $L_g$ segments in common. While for users coming from different groups, their matches are at most L-D, which is usually much smaller than $L_g$. When several users come together compare their copies of the fingerprints, they may be able to determine to which groups they belong by examining the number of matched segments. Once the colluders have identified the group codeword positions, one colluder may contribute his/her codeword only to group sub-codeword positions and another colluder from a different group only contribute to user sub-codeword positions. Under this "group-framing" attack, after the detector detects the group information, it will be limited in the group that only one colluder comes from. Since this colluder didn't contribute a user sub-codeword, he is less likely to be declared as the colluder. Hence the probability of catching an innocent user will be very high.

For GRACE, each group has different group sub-codeword from the others, and within one group users have different user sub-codeword. As a result, the fingerprint sequence for each user is different from any other user. In other words, colluders cannot figure out the grouping information through comparing their copies. And no matter which segment the colluder contributes, he/she always contributes both the group information and user information. Such a group-framing attack is unlikely to succeed under the present invention. Combined with the collusion resistance results previously described, the joint coding and embedding of GRACE provides a more secure and effective way to incorporate the group information.

To implement a detection stage for GRACE, certain embodiments of the invention implement a two-level detection scheme. First, a correlation detector is used to examine the group information in the colluded signal to identify the groups to which the colluders belong. The identified guilty groups are used to narrow down the set of fingerprints on which ECC decoding need be applied. More specifically, group information is extracted from the test signal y using a non-blind correlation detector, the detection statistic with respect to group i is $$T_G(i) = \frac{(z-x)^T b_i}{\|b\|}, \quad i = 1, 2, \ldots, g \quad (19)$$

where $b_i$ is the concatenation of the sequences representing group i's information from each segment. For example, when a single repeated symbol $a_i$ is embedded as the group sub-codeword, in each segment of group i, $b_i=[a_i \ldots a_i]$. The $k^{th}$ group is considered guilty for the test signal if $T_G(k) > h$, where h is a predetermined threshold.

To narrow down the colluders inside the guilty groups, the user sub-codeword is extracted from each segment of the test signal z through, for example, the maximum correlation detector previously described, with each of the q spreading sequences $u_j$. An ECC based decoder may then be used to decode the codeword and the codebook is examined to find the codeword within the guilty groups closest to the extracted codeword. The detector declares the user corresponding to this codeword as the colluder. Alternatively, the soft detection technique, which correlates the test signal with each user's fingerprint sequence, may be employed to identify the sequence with the highest correlation statistic.

FIGS. 10A-10F demonstrate the effectiveness certains aspects of the present invention using a numerical example employing a Reed-Solomon code with q=32, L=30, $N_u$=1024, D=29. The code is arranged into 32 groups using the procedure described above. Inside each group there are 32 codewords mutually orthogonal to each other. In the numerical example, the value $\rho=\frac{1}{7}$ was used to generate the fingerprint signal from the user sub-codeword and the group sub-codeword in GRACE. For fair comparison of the scenarios described below, $L_g$=5 was chosen for the embedding by appending strategy so that the relative energy between user sub-codeword and group sub-codeword is the same as that of GRACE. Repeated symbols were used as the group sub-codewords, such as described above. Independent identically distributed Gaussian signals with $3\times10^4$ signal samples were used to emulate the host signal.

For purposes of comparison, interleaving collusion and averaging collusion were applied to three exemplary systems—ECC based fingerprinting, GRACE fingerprinting and the Group based ECC fingerprinting with appending embedding. The probability of successfully detecting one colluder, $P_d$, was sought at WNR=0 dB in the following three scenarios: collusion within a small number of groups, colluders randomly distributed across all groups, and colluders come from distinct groups.

Figure 10B:
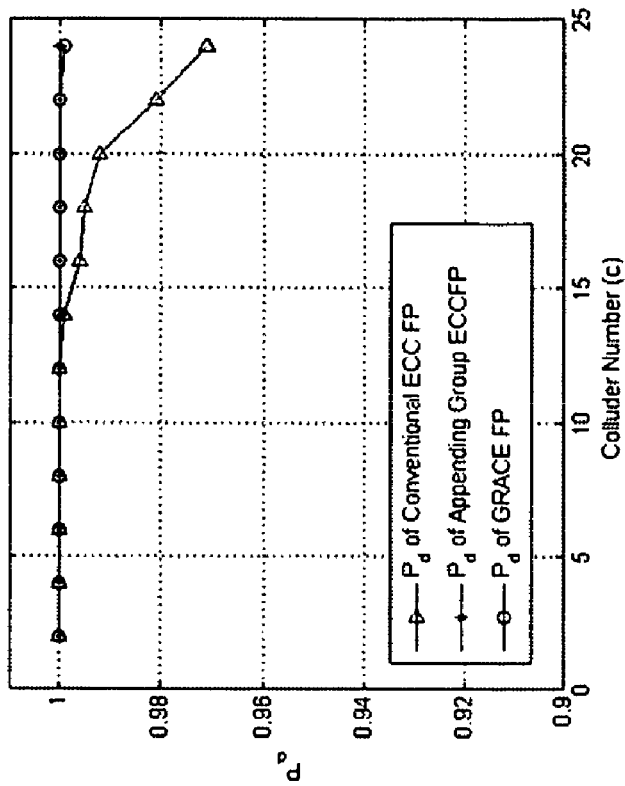
FIGS. 10A-F are graphs depicting the effectiveness of the group coding implemented in accordance with the present invention.
Figure 10A:
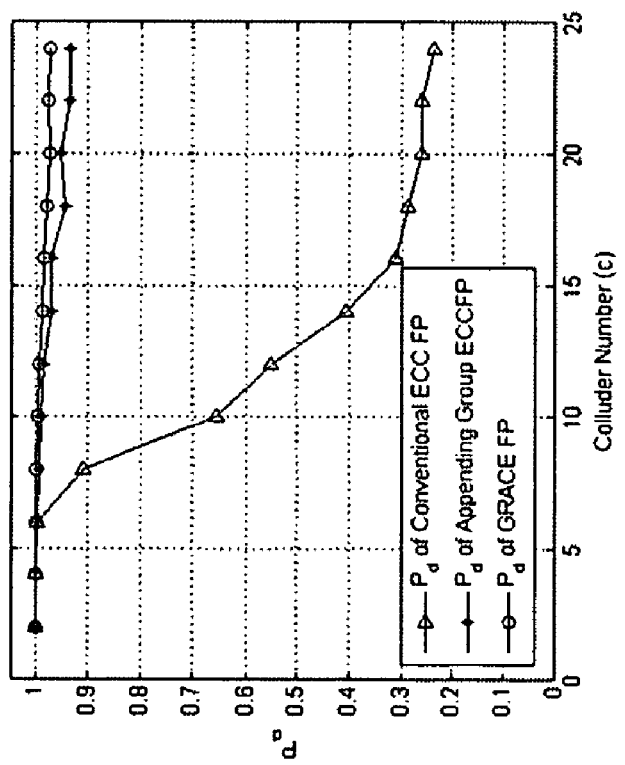

In the case of collusion within a small number of groups, the chosen grouping correctly reflects the collusion pattern of the colluder's distribution so that all the colluders come from a small number of groups. In the simulation, all colluders are from two out of 32 groups, and are randomly distributed between these two groups. The results of $P_d$ under interleaving collusion and averaging collusion are shown in FIGS. 10A and 10B, respectively. When the systems suffer interleaving collusion, it is clear that for the same number of colluders, e.g. c=8, the $P_d$'s for the GRACE process and the appending embedding strategy are similar and have 10% improvement over ECC based fingerprinting. When c gets larger, the improvement in $P_d$ can be as large as 70%. From another point of view, if $P_d$ is required to be no less than a certain value, e.g. 0.98, the number of colluders the system can resist can be improved from 6 colluders (for ECC based fingerprinting) to 18 colluders (for the proposed GRACE). Under the averaging collusion, all systems have $P_d$ close to 1, but a 2% improvement on $P_d$ brought by GRACE is readily observed.

Figure 10D:
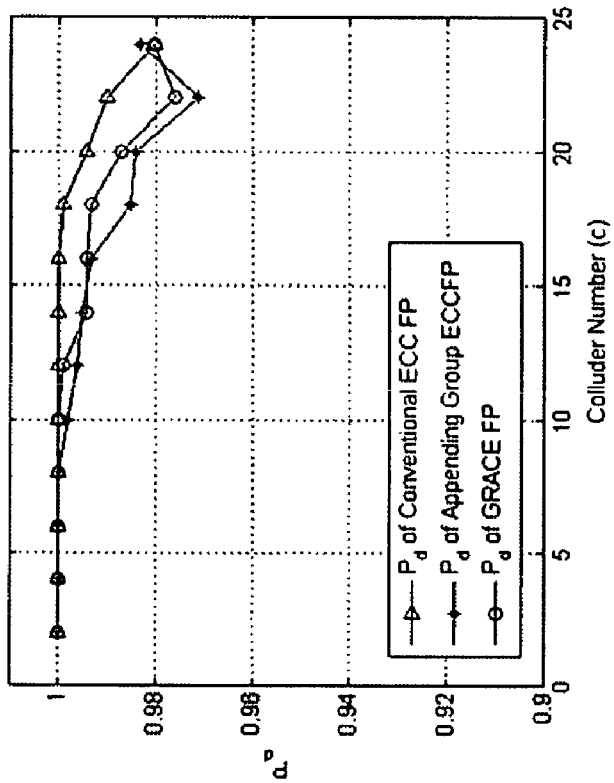
Figure 10C:
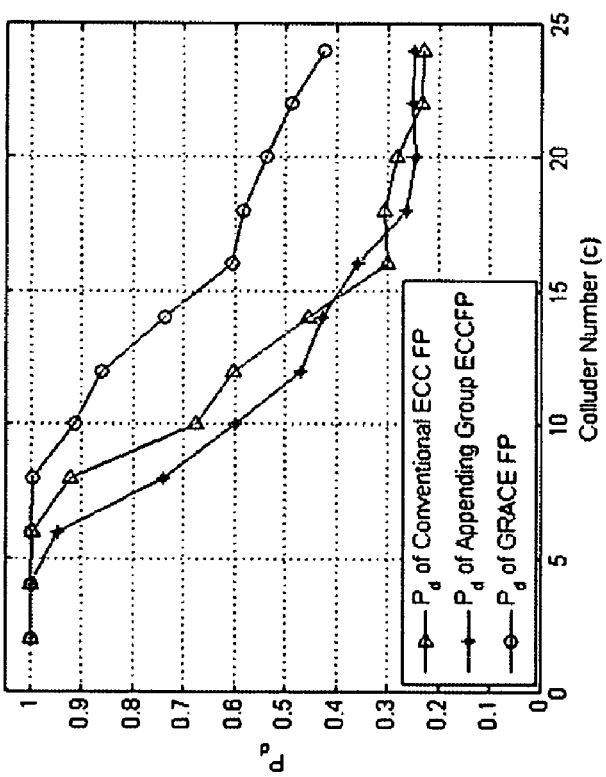

In the case where the colluders are randomly distributed across all groups, the grouping does not capture the collusion pattern. The results under interleaving and averaging collusions are shown in FIGS. 10C and 10D, respectively. Under interleaving collusion, GRACE fingerprinting has up to 30% improvement over ECC based fingerprinting on $P_d$ while the appending embedding strategy performs a slightly worse than ECC fingerprinting. Under averaging collusion, GRACE fingerprinting has comparable performance with ECC based fingerprinting.

Figure 10F:
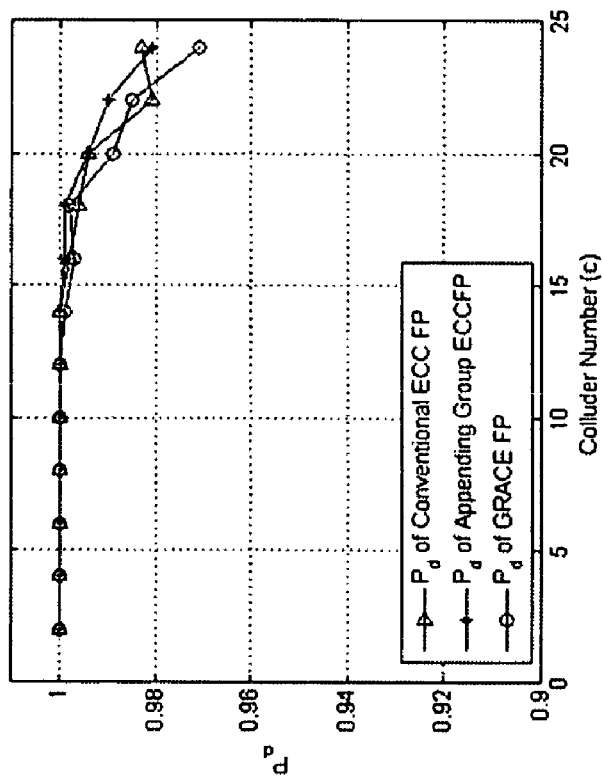
Figure 10E:
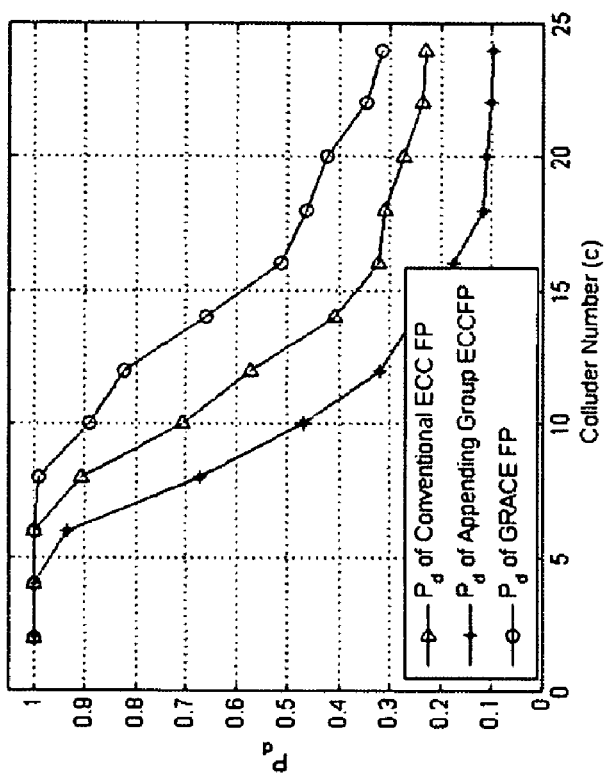

In the case where the colluders come from distinct groups, the grouping knowledge is extremely inaccurate, all the colluders come from distinct groups (i.e. the number of groups equals the number of colluders c). The results under interleaving and averaging collusions are shown in FIGS. 10E and 10F, respectively. Even in this case, under interleaving collusion, GRACE fingerprinting provides up to 20% improvement over ECC based fingerprinting on $P_d$. Under averaging collusion, the GRACE fingerprinting has comparable performance with ECC based fingerprinting.

The above results can be explained as follows. When collusion occurs in a smaller number of groups, the group information is well preserved so that the group detection for both GRACE and the appending embedding strategy is of high accuracy. Inside the small number of groups, where the user codewords can be well distinguished due to higher minimum distance, the colluder detection is better than that of non-group case. When colluders come from multiple groups or even distinct groups and apply interleaving collusion, for GRACE fingerprinting, the energy of group codeword is reduced after collusion, but preserved. So the detection is improved, though it is not as good as the first case. For appending embedding strategy, when the number of groups gets larger, especially larger than $L_g$ under interleaving attack, the detector may lose the information of some guilty groups, which results in no performance improvement over ECC based fingerprinting. Under averaging collusion, both group-based schemes have the same group information from the colluders, so their performances are similar. Due to the participation of multiple groups, the energy of the group information is reduced and extracted with low accuracy; leading to diminishing performance gain over ECC based fingerprinting.

The comparison between the GRACE fingerprinting and the appending embedding strategy demonstrates the significant performance improvement obtained by the joint consideration of coding and embedding. Apart from the collusion resistance gain, security advantages are imparted by the present invention. Overall, PSE with grouping brings a consistent improvement over the existing ECC based fingerprinting under various scenarios.

Figure 11:
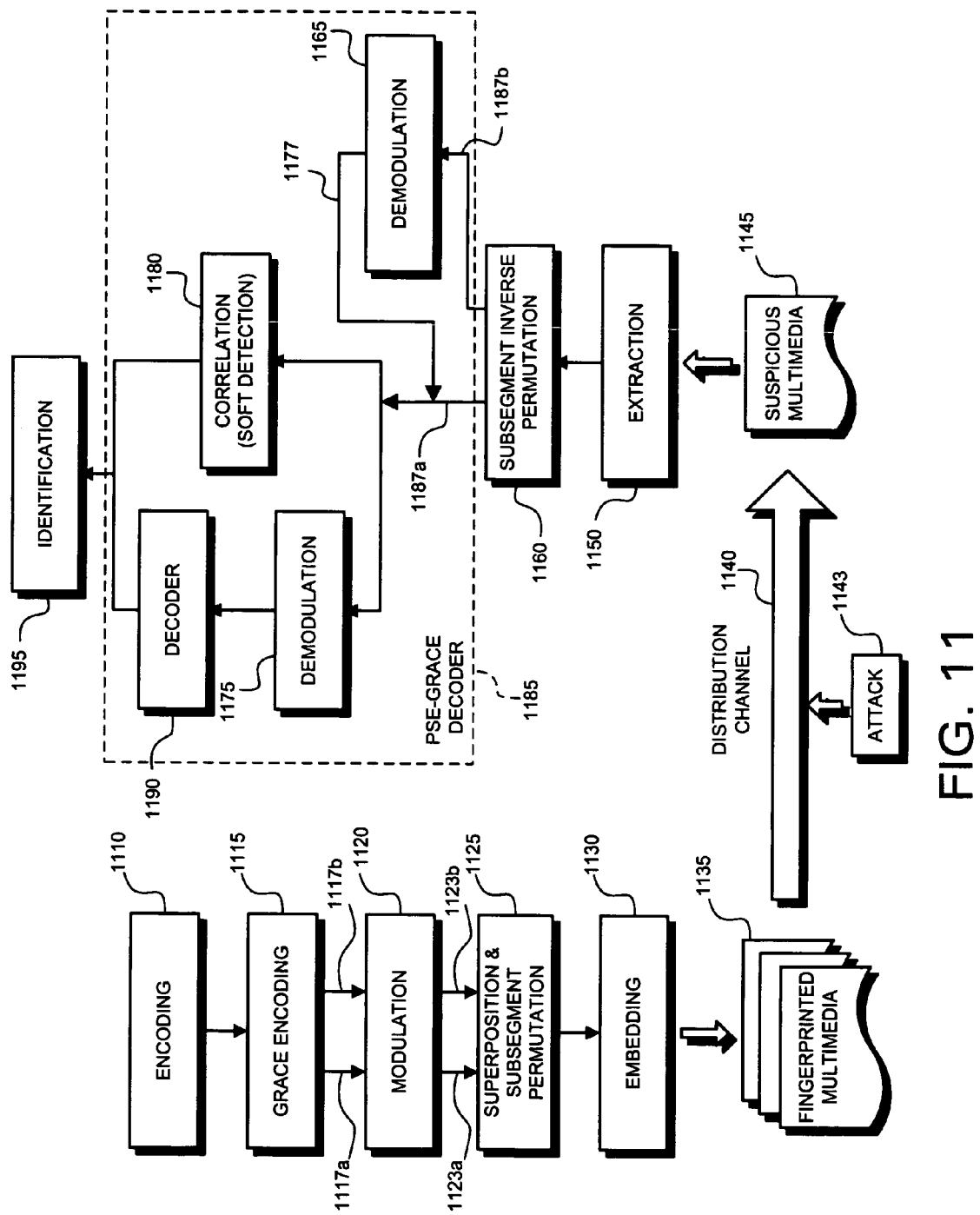
FIG. 11 is a block schematic diagram of a combined PSE and GRACE system in accordance with the present invention; and, FIG. 12A-F are graphs of the probability of detecting of a single participant in collusion on a combined PSE-GRACE system of the present invention.
Figure 12A:
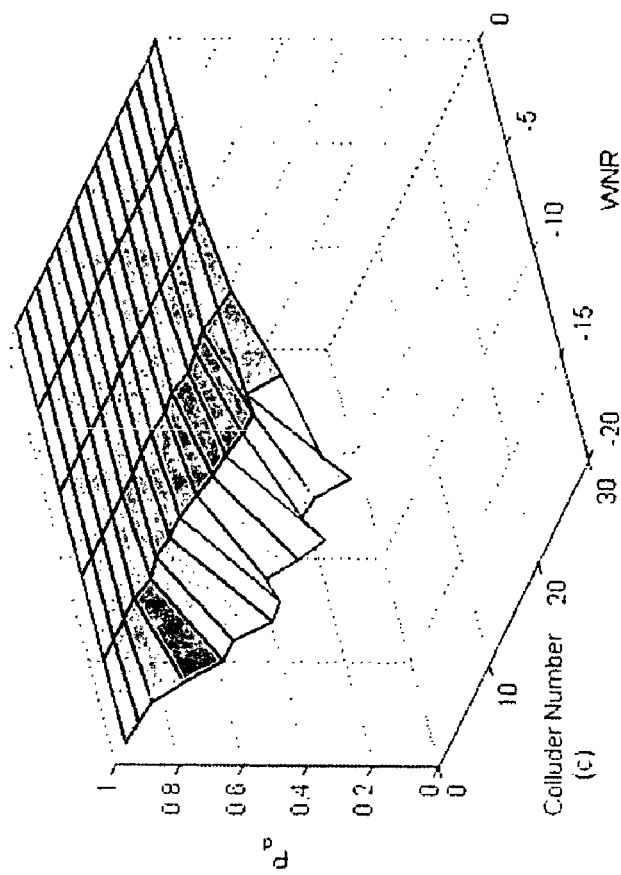
Figure 12B:
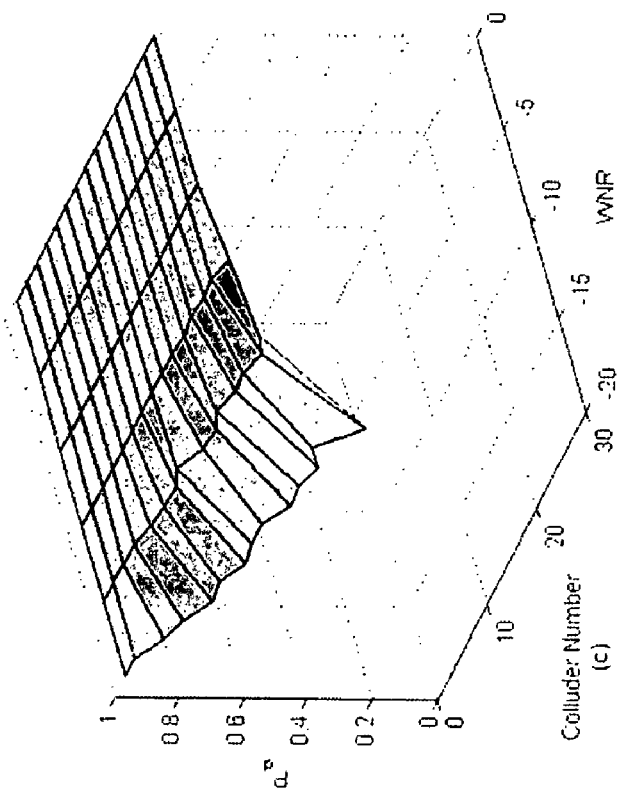
Figure 12C:
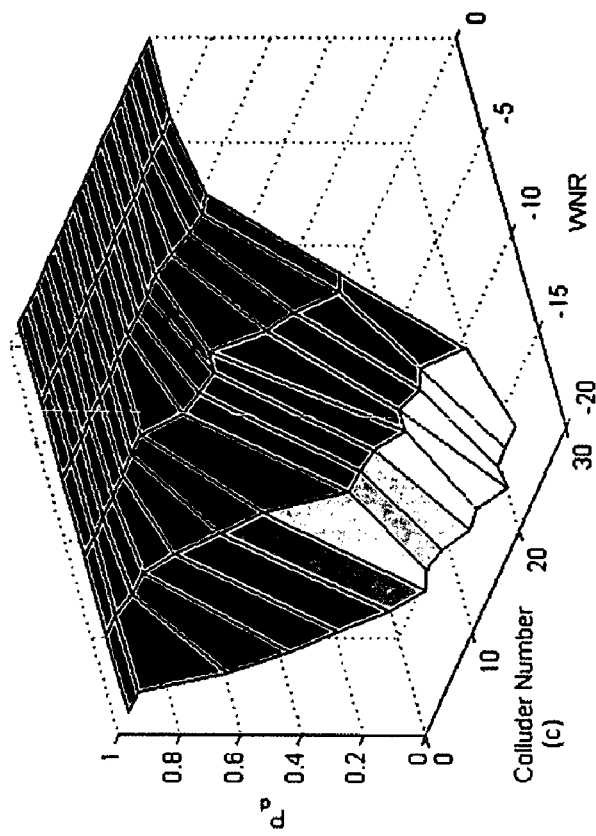
Figure 12D:
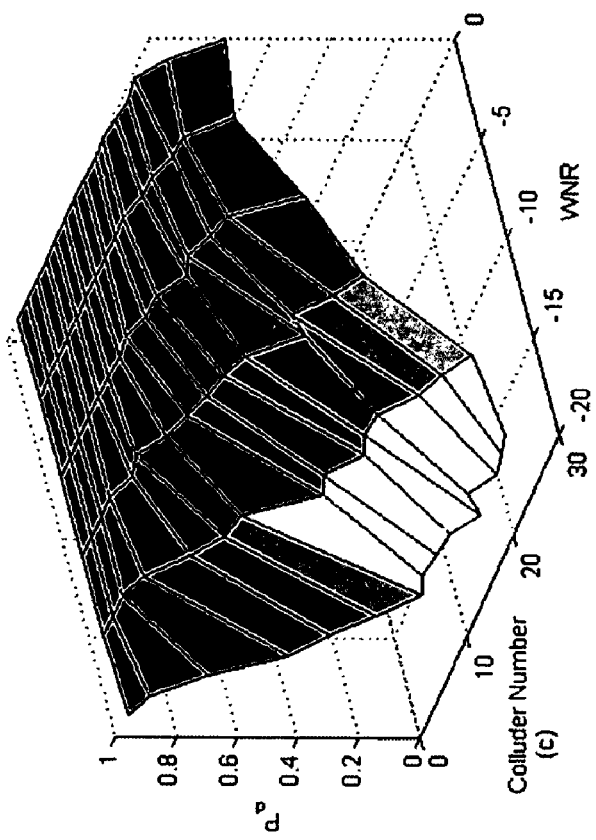
Figure 12F:
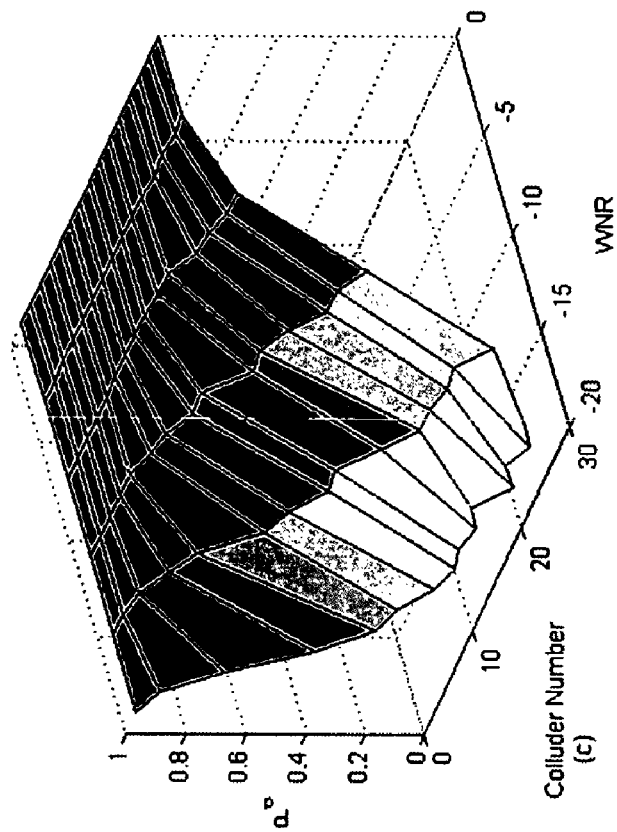
Figure 12E:
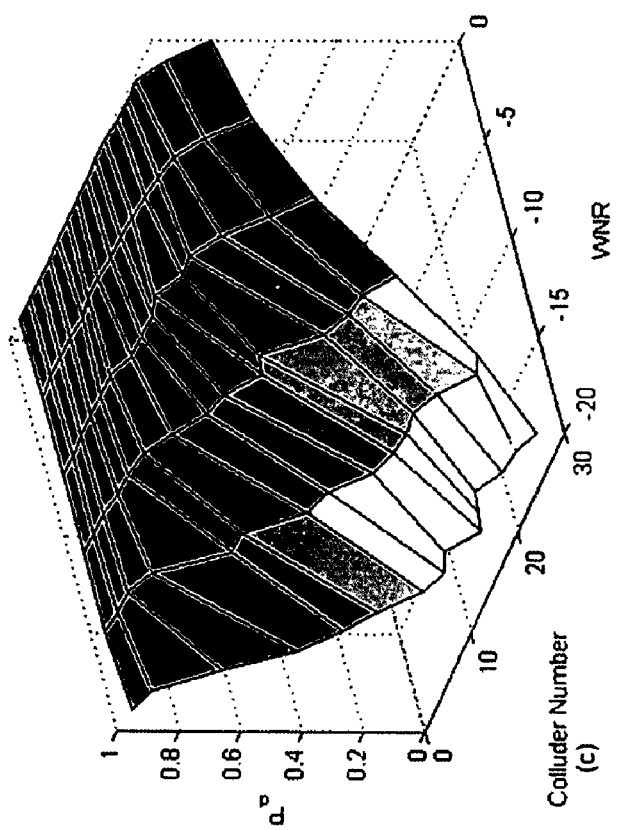

An exemplary combined PSE-GRACE system is illustrated in FIG. 11. In the exemplary system, permuted subsegment embedding is applied on the fingerprint sequence of both user sub-codeword and group sub-codeword fingerprint sequences. The user sub-codewords are encoded in encoder 1110 and the group sub-codewords are encoded in the GRACE encoder 1115. The GRACE encoder 1115 provides a user sub-codeword on line 1117a and a group sub-codeword on 1117b to modulator 1120, which produces a user fingerprint sequence on line 1123a and a group fingerprint sequence on line 1123b. The user fingerprint sequence is superposed on the group fingerprint sequence and the combination is permuted to provide a combined fingerprint sequence to embedder 1130, wherein the host signal is fingerprinted. The fingerprinted multimedia 1135 is presented to the distribution channel 1140, where it may undergo an attack 1143.

As shown in FIG. 11, the suspect multimedia 1145 is presented to a two level detector 1185, whereby group information extraction is followed by the soft detection of the colluder from within the identified groups, as described above. The combined fingerprint sequence is first extracted from the host signal by extractor 1150. The fingerprint is presented to inverse permuter and separator 1160, where user information is provided on line 1187a and the group information on line 1187b. The group sequence is demodulated at demodulator 1165. Using the group identity transferred on line 1177, the user fingerprint sequence is demodulated at 1175 and passed to decoder 1190, where the most probable symbol is extracted from each segment. Alternatively, the test signal is directly correlated with each user's fingerprint via correlator 1180. The correlation statistic provided by correlator 1180 is examined and the user having the highest correlation is declared a participant in the collusion. The identity of the guilty user is provided at 1195.

The performance of the combined PSE-GRACE fingerprinting system is compared according to the same criteria used in the comparisons made with regard to FIGS. 10A-10F. The combination of PSE and GRACE achieves better results than each individual approach as is shown in FIGS. 12A-12F. In the inaccurate grouping cases of FIGS. 12C-12F, the permuted subsegment embedding with GRACE improves the collusion resistance of the fingerprinting system by 40% more under interleaving collusion at high WNR. In the accurate grouping case of FIGS. 9A-9B, the grouping strategy boosts up the system performance of $P_d$ to nearly 1 for the value ranges of WNR and c examined with respect to FIGS. 10A-10B.

Compared with the ECC based fingerprinting, the extra computation of the GRACE Fingerprinting detection comes from the detection of guilty groups which requires O(gN) computations, where g is the total number of groups. From previous discussions, it can be readily observed that the overall computational complexity for GRACE is O(qN)+O(gN). Since g is the group number and is usually much smaller than the total number of users, the computational complexity of GRACE remains on the same order as the standard ECC based system.

It is worth mentioning that since, in most cases, the colluder detection is applied within a small amount of groups, the suspicious user set will be much smaller than that in non-grouped ECC based fingerprinting. This provides faster detection process during the colluder detection stage, resulting in a faster detection than the above analysis.

The idea of GRACE fingerprinting is to use the group information to narrow the suspicious colluders down to a smaller group. Within each group the minimum distance between the users' codewords are larger than that of the whole user set so that the users' codewords are more separated and easier to detect. Following this idea, we can extend our GRACE fingerprinting to general multi-level GRACE to capture a more complicated collusion pattern.

In certain embodiments of the invention, the codebook is partitioned or built with minimum distance $D^0$ into groups. Inside each group, the minimum distance $D^1$ is larger than $D^0$. This partition is repeated for each group until the minimum distance equals the code length L or the structure of the group can capture the collusion pattern. When combining the group information with the user information, the same strategy is used in a tree-based scheme to assign at each level an orthogonal sequence and embed them by proper scaling. On the detector side, the group information at each level is used one by one to narrow down the suspicious colluders to a smaller group. Then the colluder can be detected inside the extracted group as before.

The descriptions above are intended to illustrate possible implementations of the present invention and are not restrictive. Many variations, modifications and alternatives will be apparent to the skilled artisan upon review of this disclosure. For example, components equivalent to those shown and described may be substituted therefor, elements and methods individually described may be combined and elements described and shown as discrete may be distributed across many components. The scope of the invention should therefore be determined not with reference to the descriptions above, but with reference to the appended claims, along with their full range of equivalents.

What is claimed is:

1. A method for identifying a participant in production of an unauthorized version of multimedia content through a digital fingerprint embedded in digital data thereof, the method comprising:

assigning to a group of a plurality of authorized users of the digital data a corresponding group codeword, said group codeword being shared by said plurality of authorized users of said group thereof, assigning to each of said plurality of authorized users a user codeword, each of said group and user codewords including a respective plurality of symbols selected from a predetermined alphabet of symbols;

dividing the digital data into a plurality of host data segments equal in number to said respective plurality of symbols;

encoding a fingerprint signal as a concatenation of digital code sequences corresponding to each of said respective plurality of symbols, said fingerprint signal including a respective plurality of fingerprint segments equal in number to said respective plurality of host data segments, each of said fingerprint segments containing at least one of said code sequences corresponding to said group and user codewords;

segmenting each of said fingerprint segments into a plurality of subsegments;

randomly permuting said subsegments of said fingerprint signal, wherein each said subsegment contains a partial code sequence of a plurality of symbols from the plurality of authorized users' code;

embedding said permuted fingerprint signal into the digital data;

extracting a test fingerprint signal from a copy of the digital data;

segmenting said test fingerprint signal into said plurality of subsegments;

applying an inverse permutation to said subsegments of said test fingerprint signal with respect to said permutation of said subsegments of said fingerprint signal; and identifying at least one respective group of said plurality of authorized users the participant belongs to, and identifying the participant as one of said at least one respective identified group of said plurality of authorized users assigned said group codeword determined from said inversely permuted test fingerprint signal.

2. The method for identifying a participant in production of an unauthorized version of multimedia content as recited in claim 1 where said participant identifying step includes the steps of:

correlating said inversely permuted test fingerprint signal with each of a plurality of said fingerprint signals, each of said fingerprint signals being encoded from said group codeword assigned to a corresponding one of said plurality of authorized users; and identifying said participant as said authorized user within said at least one respective identified group assigned to said group codeword corresponding to one of said fingerprint signals being correlated to said inversely permuted fingerprint signal by greater than a predetermined threshold.

3. The method for identifying a participant in production of an unauthorized version of multimedia content as recited in claim 1, where said participant identifying step includes the steps of:

correlating each of said fingerprint segments of said inversely permuted test fingerprint signal with a code sequence corresponding to each symbol of said alphabet of symbols;

identifying a symbol in said each fingerprint segment of said inversely permuted test fingerprint signal as that corresponding to said code sequence being correlated to said fingerprint segment by greater than a predetermined threshold;

concatenating each symbol identified in said symbol identifying step to form a group codeword; and identifying said participant as said authorized user within said at least one respective identified group assigned to said group codeword formed in said symbol concatenating step.

4. The method for identifying a participant in production of an unauthorized version of multimedia content as recited in claim 1, where said codeword assigning step includes the step of:

selecting said group codeword assigned to said authorized user from one of a plurality of groups of said group codewords, each group codeword in a corresponding one of said groups, when encoded into said concatenation of digital code sequences, being orthogonal to said concatenation of digital code sequences corresponding to remaining ones of said codewords in said corresponding one of said groups.

5. The method for identifying a participant in production of an unauthorized version of multimedia content as recited in claim 4, further including the steps of:

establishing a respective group codeword for each of said groups;

encoding a group fingerprint signal as a concatenation of digital code sequences corresponding to each of a plurality of symbols in said respective group codewords;

embedding said group fingerprint signal into said digital data;

extracting a test fingerprint signal from said copy of the digital data;

identifying a group corresponding to said participant as one of said plurality of groups determined from said test fingerprint signal, and identifying said participant within said identified group.

6. The method for identifying a participant in production of an unauthorized version of multimedia content as recited in claim 5, where said group identifying step includes the step of:

correlating said test fingerprint signal with each of a plurality of said group fingerprint signals, each of said group fingerprint signals encoded from each of said respective group codewords; and identifying said group as that corresponding to one of said group fingerprint signals being correlated to said test fingerprint signal by greater than a predetermined threshold; and wherein said participant identification within said identified group includes the steps of:

correlating said test fingerprint signal with each of a plurality of said user fingerprint signals, each of said user fingerprint signals being encoded from each of said user codeword within said identified group, and identifying said participant as that corresponding to one of said fingerprint signals being correlated to said user test fingerprint signal by greater than a predetermined threshold.

7. A method for identifying a participant in production of an unauthorized version of multimedia content through a digital fingerprint embedded in digital data thereof, the method comprising:

forming a plurality of user codewords, each of said user codewords corresponding to a concatenation of a plurality of coding sequences;

grouping said user codewords into a plurality of groups such that said concatenation of coding sequences corresponding to each of said user codewords in a corresponding one of said group is orthogonal to said concatenation of coding sequences corresponding to remaining ones of said user codewords in said one of said groups;

assigning each of said user codewords in a corresponding one of said groups to a corresponding authorized user of the digital data such that at least one characteristic of said user is common to other users assigned a user codeword from said corresponding one of said groups;

dividing the digital data into a plurality of host data segments equal in number to said plurality of coding sequences;

encoding a fingerprint signal as said concatenation of code sequences corresponding to each of said user codewords, said fingerprint signal including a plurality of fingerprint segments equal in number to said plurality of host data segments, each of said fingerprint segments containing a corresponding one of said code sequences;

segmenting each of said fingerprint segments into a plurality of subsegments;

permuting said subsegments of said fingerprint signal, wherein each said subsegment contains a partial code sequence of a plurality of symbols from the plurality of authorized users' code;

embedding said permuted fingerprint signal into the digital data;

extracting a test fingerprint signal from a coy of the digital data;

segmenting said test fingerprint signal into said plurality of subsegments;

applying an inverse permutation to said subsegments of said test fingerprint signal inversely with respect to said permutation of said subsegments of said fingerprint signal;

identifying the participant as one of said authorized users assigned a user codeword determined from said inversely permuted test fingerprint signal;

forming a group codeword for each of said plurality of groups, said group codeword including a plurality of symbols;

encoding a group fingerprint signal as a concatenation of digital code sequences corresponding to each of said plurality of symbols in a corresponding one of said group codewords;

embedding said group fingerprint signal into said digital data;

extracting a test group fingerprint signal from said copy of the digital data; and identifying a group corresponding to said participant as one of said plurality of groups determined from said test group fingerprint signal.

8. The method for identifying a participant in production of an unauthorized version of multimedia content as recited in claim 7, where said group identifying step includes the step of:

correlating said test group fingerprint signal with each of a plurality of said group fingerprint signals respectively encoded from each of said group codewords; and identifying said group as that corresponding to one of said group fingerprint signals being correlated to said test group fingerprint signal by greater than a predetermined threshold.

9. The method for identifying a participant in production of an unauthorized version of multimedia content as recited in claim 8, where said participant identifying step includes the steps of:

correlating each of said fingerprint segments of said inversely permuted test fingerprint signal with a code sequence corresponding to each symbol of said alphabet of symbols;

identifying a symbol in said each fingerprint segment of said inversely permuted test fingerprint signal corresponding to said code sequence that is correlated to said fingerprint segment by greater than a predetermined threshold;

concatenating each symbol identified in said symbol identifying step to form a codeword; and identifying said participant as said authorized user assigned to a user codeword if the number of matched symbols in the codeword formed in the symbol concatenating step and the authorized codeword is greater than a certain threshold.

10. The method for identifying a participant in production of an unauthorized version of multimedia content as recited in claim 9, where said participant identifying step includes the step of searching for said codeword formed in said symbol concatenating step in only said group of user codewords identified in said group identifying step.

11. The method for identifying a participant in production of an unauthorized version of multimedia content as recited in claim 7, where said group codeword forming a step includes the step of setting each of said symbols forming said group codeword to be identical to one another.

12. The method for identifying a participant in production of an unauthorized version of multimedia content as recited in claim 7, where said group codeword forming step includes the step of forming said group codeword to be, when encoded as a concatenation of digital code sequences, orthogonal to said concatenation of digital code sequences corresponding to remaining ones of said group codewords.

13. The method for identifying a participant in production of an unauthorized version of multimedia content as recited in claim 12, where said group codeword forming step includes the step of forming said group codeword to be, when encoded as said concatenation of said digital code sequences, orthogonal to said concatenation of code sequences corresponding to each of said codewords in said group.

14. A method for identifying a participant in production of an unauthorized version of multimedia content through a digital fingerprint embedded in digital data thereof, the method comprising:

assigning to a group of a plurality of authorized users of the digital data a corresponding group codeword, said group codeword being shared by said plurality of authorized users of said group thereof and including a plurality of symbols selected from a predetermined alphabet of symbols;

encoding each symbol in said alphabet of symbols as a corresponding digital code sequence;

segmenting each digital code sequence for each of said symbols of said alphabet into a plurality of subsequences;

segmenting the digital data into a plurality of host data segments equal in number to said plurality of symbols forming said codeword, each of said host data segments designated with a corresponding symbol of said codeword;

segmenting each of said host data segments into a plurality of subsegments, each of said subsegments designated with a portion of said symbol designated to said corresponding host data segment;

forming a sub-segmented codeword from symbol portions designated to each of said plurality of subsegments, said sub-segmented codeword being ordered identically to an order of said symbol portions of said designated subsegments;

permuting said sub-segmented codeword, wherein each said subsegment contains a partial code sequence of a plurality of symbols from the plurality of authorized users' code;

embedding a corresponding one of said subsequences respectively into a corresponding copy of each of said plurality of subsegments to produce a plurality of embedded subsegments equal in number to a number of symbols in said alphabet multiplied by a number of subsegments in said plurality of subsegments;

concatenating said embedded subsegments in accordance with said permuted sub-segmented codeword to form a data signal;

extracting a test fingerprint signal from said data signal, said test fingerprint signal including a plurality of sub-segments equal in number to a number of subsegments in said sub-segmented codeword;

applying an inverse permutation to said subsegments of said test fingerprint signal inversely with respect to said permutation of said subsegments of said sub-segmented group codeword; and identifying the participant as one of said group of said plurality of said group of authorized users assigned a group codeword determined from said inversely permuted test fingerprint signal.

15. The method for identifying a participant in production of an unauthorized version of multimedia content as recited in claim 14, where said collusion participant identifying step includes the steps of:

correlating said inversely permuted test fingerprint signal with each of a plurality of said fingerprint signals, each of said fingerprint signals encoded from said group codeword assigned to a corresponding one of said plurality of authorized users; and identifying said participant as said authorized user assigned to said group codeword corresponding to one of said fingerprint signals being correlated to said inversely permuted fingerprint signal by greater than a predetermined threshold.

16. The method for identifying a participant in production of an unauthorized version of multimedia content as recited in claim 14, where said collusion participant identifying step includes the steps of:

forming in said inversely permuted test fingerprint signal a plurality of fingerprint segments equal in number to said plurality of host data segments;

correlating each of said fingerprint segments of said inversely permuted test fingerprint signal with a code sequence corresponding to each symbol of said alphabet of symbols;

identifying a symbol in said each fingerprint segment of said inversely permuted test fingerprint signal as that corresponding to said code sequence being correlated to said fingerprint segment by greater than a predetermined threshold;

concatenating each symbol identified in said symbol identifying step to form a codeword; and identifying said participant as said authorized user assigned to said codeword if the number of matched symbols in the group codeword formed in the symbol concatenating step and the authorized group codeword is greater than a certain threshold.

17. The method for identifying a participant in production of an unauthorized version of multimedia content as recited in claim 14, further including the step of multicasting said plurality of subsegments prior to said subsegment concatenation step.

18. The method for identifying a participant in production of an unauthorized version of multimedia content as recited in claim 17, further including the step of providing to a distribution channel said data signal subsequent to said subsegments multicasting step and prior to said test fingerprint signal extracting step.

19. The method for identifying a participant in production of an unauthorized version of multimedia content through a digital fingerprint embedded in digital data thereof as recited in claim 1, further comprising the step of:

mixing said fingerprint signals for said group and user codewords in at least one of said fingerprint segments.

* * * * *